US008762206B2

(12) United States Patent  (10) Patent No.: US 8,762,206 B2
Morgenstern et al.  (45) Date of Patent: Jun. 24, 2014

(54) METHOD AND SYSTEM FOR WORD OF MOUTH ADVERTISING VIA A COMMUNICATIONS NETWORK

(75) Inventors: Jared Morgenstern, Aliso Viejo, CA (US); Edward Lim, Aliso Viejo, CA (US)

(73) Assignee: Buy.com, Inc., Alison Viejo, CA (US)

( * ) Notice: Subject to any disclaimer, the term of this patent is extended or adjusted under 35 U.S.C. 154(b) by 228 days.

(21) Appl. No.: 10/997,121

(22) Filed: Nov. 24, 2004

(65) Prior Publication Data
US 2005/0149397 A1    Jul. 7, 2005

Related U.S. Application Data

(60) Provisional application No. 60/525,905, filed on Nov. 26, 2003.

(51) Int. Cl.
G06Q 30/00    (2012.01)
G06Q 99/00    (2006.01)

(52) U.S. Cl.
USPC ...................................... 705/14.73; 705/319

(58) Field of Classification Search
USPC ............................................................ 705/14
See application file for complete search history.

(56) References Cited

U.S. PATENT DOCUMENTS

| | | | |
|---|---|---|---|
| 5,774,869 A | 6/1998 | Toader | |
| 5,960,411 A | 9/1999 | Hartman et al. | |
| 6,175,831 B1 | 1/2001 | Weinreich et al. | |
| 6,269,369 B1 | 7/2001 | Robertson | |
| 6,496,803 B1* | 12/2002 | Seet et al. | 705/14 |
| 6,662,192 B1* | 12/2003 | Rebane | 1/1 |
| 6,954,728 B1* | 10/2005 | Kusumoto et al. | 705/14.4 |
| 6,976,003 B1* | 12/2005 | Hamor et al. | 705/14.46 |
| 7,069,308 B2* | 6/2006 | Abrams | 709/218 |
| 2001/0020231 A1 | 9/2001 | Perri, III et al. | |

(Continued)

FOREIGN PATENT DOCUMENTS

JP  2003-281445  10/2003
WO  WO 96/24213  8/1996

OTHER PUBLICATIONS

Dr. Elliot McGucken, May 28, 2003 22SURF, Building the world's content marketplaces with Open Source Content Management Systems, presented at the 2003 OSCOM (as indicated in http://Slideml.bitflux.ch/oscom/Cambridge).*

(Continued)

*Primary Examiner* — Yehdega Retta
(74) *Attorney, Agent, or Firm* — Mitchell P. Brook; McKenna Long & Aldridge LLP

(57) ABSTRACT

An advertising method and system allows individuals or groups to interactively select brands from a service provider to associate with their online presence in exchange for the online service, as part of an online service, or for some reward, monetary or otherwise. Individuals or groups select brands from a pool of advertisers based on personal preference and may use them as a means of expression for their online audience as part of an online service. This provides advertisers with self-selected targeted marketing to affinity groups, the online version of word of mouth advertising. Information regarding the online activity of these individuals or groups, including their audience, reach, and influence is used by the service provider in order to calculate the cost to the participating brand advertisers for supplying their advertisements to the service provider's pool as well as to solicit new brand advertisers for the pool.

1 Claim, 33 Drawing Sheets

(56) References Cited

U.S. PATENT DOCUMENTS

| | | |
|---|---|---|
| 2001/0034644 A1 | 10/2001 | Anavi et al. |
| 2001/0044745 A1 | 11/2001 | Shaw |
| 2002/0022996 A1 | 2/2002 | Sanborn et al. |
| 2002/0026360 A1 | 2/2002 | McGregor et al. |
| 2002/0103879 A1 | 8/2002 | Mondragon |
| 2002/0174012 A1 | 11/2002 | Litwin |
| 2003/0046160 A1 | 3/2003 | Paz-Pujalt et al. |
| 2003/0191816 A1 | 10/2003 | Landress et al. |
| 2003/0225609 A1 | 12/2003 | Klipfell, III |
| 2003/0236701 A1 | 12/2003 | Rowney et al. |
| 2004/0225715 A1 | 11/2004 | Gottfried |
| 2005/0004837 A1 | 1/2005 | Sweeney et al. |
| 2005/0004840 A1 | 1/2005 | Wanninger |
| 2005/0203800 A1* | 9/2005 | Sweeney et al. ............ 705/14 |

OTHER PUBLICATIONS

Printouts of http://myspace.com/, (18 pages), printed on Feb. 23, 2005.

Printouts of http://www.friendster.com/, (23 pages), printed on Feb. 23, 2005.

Printouts of http://multiply.com/, (19 pages), printed on Feb. 23, 2005.

Printouts of http://new.ryze.com/, (15 pages), printed on Feb. 23, 2005.

Printout of http://www.friendster.com/info/index.php?statpos=footer, printed on Feb. 23, 2005.

Printout of http://multiply.com/info/corp, printed on Feb. 23, 2005.

Printout of http://isp.2get2.net/cgi-mod/mi/welcome.cgi?nav=register_free&plan_abbr=free1&cb=6652, printed on Mar. 9, 2005.

Printout of http://www.surfwithus.net/rewards.cfm?promotioncode=googlefree, printed on Mar. 9, 2005.

Printout of http://netzero.net/, printed on Mar. 9, 2005.

Printout of http://web.archive.org/web/20000511043725/http://www.sixdegrees.com/ (printed on Jan. 3, 2005).

Printout of http://web.archive.org/web/19980521125430/http://sixdegrees.com/About/ (printed on Jan. 3, 2005).

Printout of http://web.archive.org/Web/19980416103117/sixdegrees.com/About/BecomeAMember.cfm?PF=166181270631 (printed on Jan. 3, 2005).

Printout of http://web.archive.org/web/19980521125824/sixdegrees.com/About/ Faq.cfm (printed on Jan. 3, 2005).

* cited by examiner

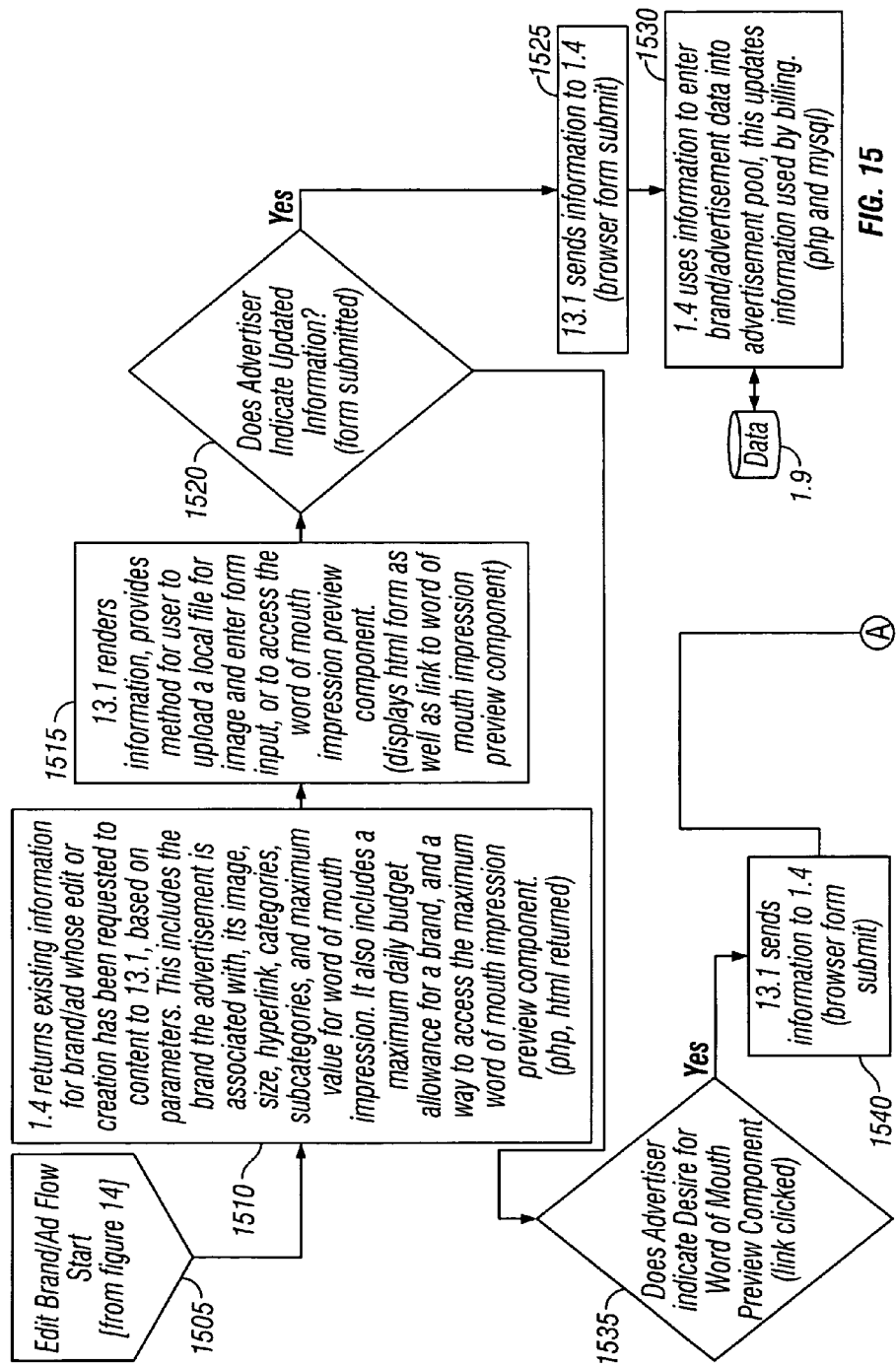

Advertisement Submission

METHOD AND SYSTEM FOR WORD OF MOUTH ADVERTISING VIA A COMMUNICATIONS NETWORK

CROSS REFERENCE TO RELATED APPLICATION

Priority is claimed to Provisional Patent Application Ser. No. 60/525,905, filed Nov. 26, 2003, the contents of which are incorporated herein by reference.

BACKGROUND OF THE INVENTION

1. Field of the Invention

The present invention deals with online advertising from a bottom-up approach, with individuals or groups agreeing to be associated with advertisements in exchange for a service, as part of an online service, or for some reward, monetary or otherwise, and advertisers paying the service provider for this type of marketing.

2. Description of the Related Art

Internet marketing traditionally have relied on advertisers purchasing ad space on particular websites. More recently, businesses have emerged that match advertisers with websites that meet certain criteria, enabling advertisers to have some degree of targeted marketing. In addition, websites can now proactively and dynamically generate advertisements by describing their content and subscribing to a service like "GOOGLE" ads, which supplies them with advertisements that are relevant.

Both these approaches aim to achieve the same goal: to bombard a user with an idea in the hopes that they may be convinced to take steps towards purchasing a product or soliciting a service. However, they both lack unbiased advocates. A viewer is keenly aware that they are being offered a service or product by the entity that is going to profit. This is useful if the viewer is searching for a product or service, but not in the case where his/her primary activity is not product or service searching.

Also, an increasingly popular feature on online communities is the ability for a user to express his/herself using a variety of creative tools. For example, websites exist that allow users to create a virtual character, complete with clothes, accessories, and furniture. These sites are known collectively as avatar sites. A preferred embodiment of this invention would treat branding as a means of self expression, and the web as just another place where we live.

Example patent which relate to the background of the present invention include U.S. Pat. Nos. 6,175,831; 6,269,369; and 5,960,411. Additional descriptions of the background of the present invention may be found in the following books: "The Tipping Point: How Little Things Can Make a Difference" and "Kellogg on Marketing" (Edited by Dawn Iacobucci). Another known example of the use of advertisements online and related pricing issues is described, for example, in connection with Google AdWords.

Known advertising concepts generally allow for sponsorship of individuals or groups, i.e. sports professionals or sports teams, but have not typically extended towards less well known individuals or groups in a manner that is of high value or easily scalable for the advertiser. Known advertising techniques also suffer from the perceived commercialization of the sponsor, whether it is a movie star or a popular internet site, to the extent that observers can assume that the sponsor is receiving a benefit for his/her role.

Accordingly, there is a need for a system of word of mouth advertising that extends sponsorships to lesser known individuals.

SUMMARY OF THE INVENTION

The present invention alleviates to a great extent the disadvantages of the known advertising systems by providing an automated mechanism where brand owners can tap into a network of individuals or groups who are willing to represent their brands via their identities as part of a community.

In an embodiment of the present invention, a system whereby advertisers can tap into a willing and enthusiastic base of individual or group representatives is provided. In another embodiment of the present invention a method and system of evaluating the advertising value of individual or group representatives is provided. In another aspect of the invention a system where a service provider facilitates interaction between advertisers and individuals or groups is provided.

In a further aspect of the invention, the invention touches on the field of online communities and social networking, as these are the areas where such an advertising campaign are understood more likely to be successful because of the value of the association of a brand and the individual or group advocating the brand combined with the credibility an individual or group is likely to receive as a member of such a community.

In one embodiment, the invention, a framework of achieving word of mouth advertising on the internet is provided wherein when one or more users view an advertisement, they can associate it with the individual or group who has elected to include it as part of their online presence, even though that user may receive no direct monetary benefit for doing so. By providing individuals with advertisements that allow them to express themselves in the context of a larger community, as well as the choice not to select advertisements if they believe that none allow them to properly express themselves, a framework for word of mouth advertising on the web can be created. This framework allows brands to penetrate social groups where individuals have a higher probability of common interests. For example, if a user incorporates Adidas® into his/her online presence and a friend notices this, it has more value than if she saw the product advertised on a commercial website such as cnn.com by way of example. It should be understood that the term "user" or "users" herein refers to anyone accessing or participating in the word of mouth advertising system disclosed herein, including for example, individuals, groups, advertisers, advertiser representatives etc.

An embodiment of the present invention provides a method and system for associating advertisements and brands with individuals and groups whereby the individuals or groups expressly decide the advertisements that they wish to be associated with as part of their identity within an online community. The available advertisements are part of a pool of advertisements submitted to the service provider by advertising agents who pay for their relative placement within the advertisement selection process and word of mouth impressions value. The advertising agent or potential advertising agent is provided with tools to manage, pay for, and optimize an ad campaign.

BRIEF DESCRIPTION OF THE DRAWINGS

These and other features of the invention, its nature, and various advantages will be appreciated from the accompanying drawings, and the following detailed description in which like reference numbers represent like parts throughout.

DETAILED DESCRIPTION OF THE INVENTION

In the following paragraphs, the present invention will be described in detail by way of example with reference to the accompanying drawings. Throughout this description, the preferred embodiments and examples shown should be considered as exemplars, rather than as limitations on the present invention. It will be apparent that the invention can be embodied in a wide variety of forms, some of which may be quite different from those of the disclosed embodiments. Consequently, the specific structural and functional details disclosed herein are merely representative and do not limit the scope of the invention. As used herein, the "present invention" refers to any one of the embodiments of the invention described herein, and any equivalents. Furthermore, reference to various aspects of the invention throughout this document does not mean that all claimed embodiments or methods must include the referenced aspects.

Generally speaking, the present invention relates to a word of mouth advertising system in which a delivery module provides advertisements from one or more server systems either associated with the delivery module or remote from it. The advertisements are provided to users (also referred to as clients) for viewing. In an embodiment, the user selects a subject or other person or group, also known as an agent, and one or more advertisements associated with the group or agent (an affinity grouping) are displayed. The user system is provided with a selection module (such as a browser or other access software or system) wherein the user can select one or more of said advertisements for viewing, such as via clicking. Optionally, a reward module is provided wherein advertisement deliveries and/or advertisement selections are tracked and rewards given to the affinity group owner (agent). In another alternative the agent can redistribute the rewards as desired, or can predesignate a distribution of the rewards, i.e. a two-tier or multi-tier marketing or reward system. Likewise rewards can be provided for actual goods or services sold arising from users viewing advertisements. In one example, the goods or services can be delivered via internet retailer or distributor services or via brick and mortar providers.

Figure 1:
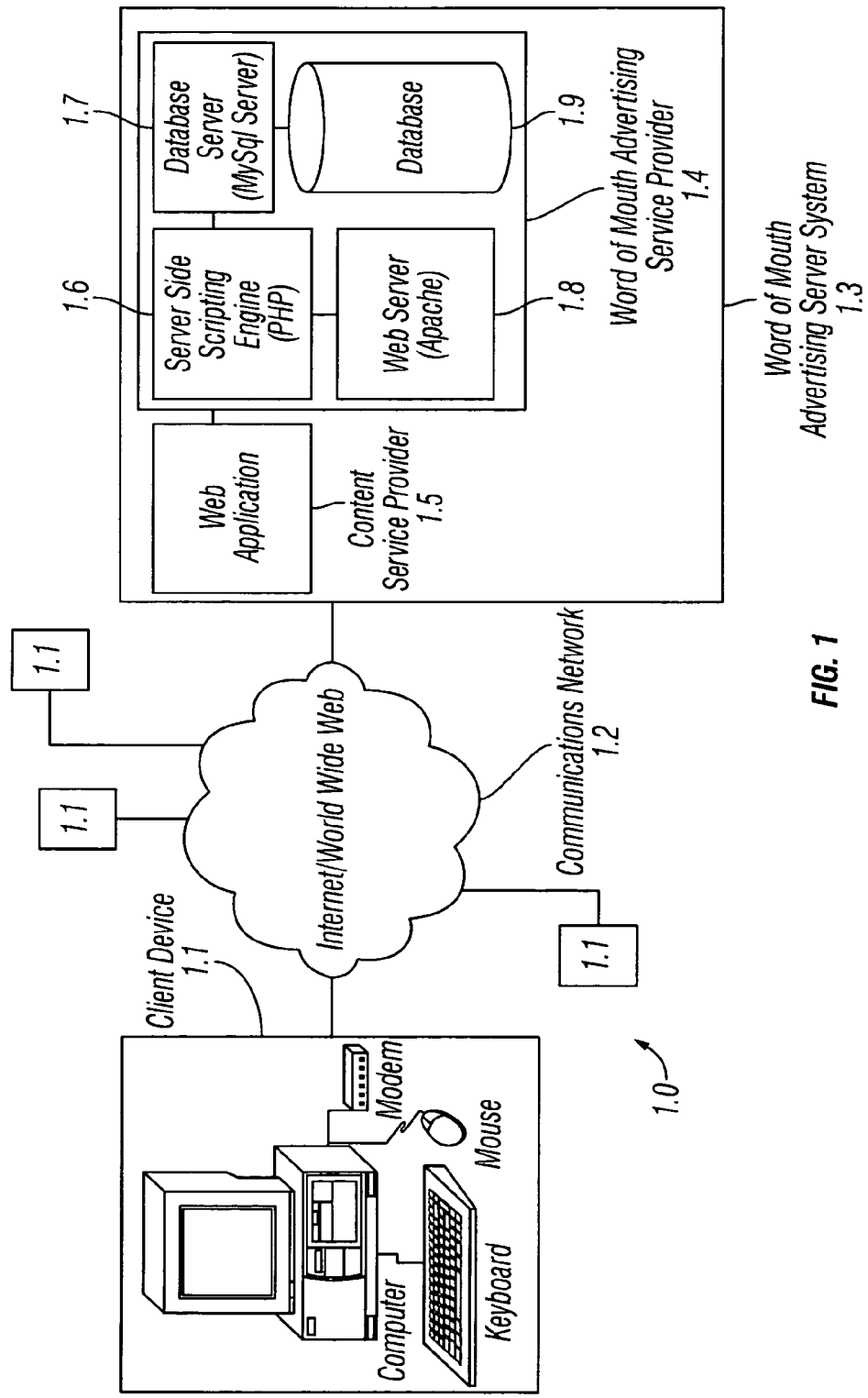
FIG. 1 is a block diagram of a word of mouth advertising system via a communications network (WMASVCN) in accordance with a preferred embodiment of the present invention.

Referring to FIG. 1, there is generally shown a word of mouth advertising system via a communications network (WMASVCN 1.0) in accordance with the present invention. The WMASVCN 1.0 includes a plurality of client devices 1.1, each of which is coupled to a network 1.2, and, in turn, to a word of mouth advertising system (WMAS) 1.3. Each client device 1.1, of which an example of one is shown in some detail and three others are represented in block form, is typically a personal computer, such as a Windows-based personal computer. It should be understood that client devices may also be laptops, PDA's, workstations, mobile phones, internet enabled TV, etc. Each client device 1.1 preferably has an input device such as a keyboard and/or mouse and a display for communication with a user. The client device 1.1 has communications software and a modem (or some other form of Internet connectivity, such as a DSL modem, cable modem, T-1 line, ISDN line, etc). Communications software may be any software suitable for telecommunications, and is preferably browser software. The communications software is for communication over network 1.2 with a WMAS 1.3. Network 1.2 may be, for example, the Internet.

The WMAS 1.3 includes for example a Word of Mouth Advertising Service Provider (WMASP) 1.4. and a Content Service Provider (CSP) 1.5 connected by a communication channel (i.e. the Internet). The CSP 1.5 is preferably a web application that displays contents authored by agents, where agents are individuals or groups. The CSP 1.5 and the WMASP 1.4 may be a wholly integrated web application such as a web log and social networking web site that allows users to decorate themselves with brands and that shares the same web server 1.8, database provider, and server side scripts. It should also be understood that the CSP 1.5 may be a third party subscriber to the WMASP 1.4 or vice versa. Examples of third party web applications that could serve as Content Service providers are web log systems such as Blogger, social networking systems such as Friendster, instant messaging systems such as AOL Instant Messenger, and community oriented applications such as Ebay, provided these services are modified to interface with the WMASP 1.4.

The WMASP 1.4 typically includes for example of a web server, which is characteristically a programmed computer, preferably one which supports a HyperText Transfer Protocol (HTTP), that handles document requests and provides other services, returning information to the requester. It should be understood that the web server may communicate by exposing web services which communicate XML, etc. It should be clear that the web server could be replaced by an application that functions as a server, such as a program that listens to a specific port for incoming request. Many suitable software programs for the web server exist, including Apache and Microsoft Internet Information Services (IIS). WMASP 1.4, in addition to a web server, includes a server side scripting engine 1.6, preferably PHP, available from php.net, connected to the web server for pre-processing an output from the web server before it is returned via the communications network. The server side scripting engine 1.6 also allows communication with a database server 1.7, preferably Mysql, available from mysql.com, using the Open Database Connectivity (ODBC) protocol. Other similar server side scripting products could be used, such as Cold Fusion, ASP.NET technology. The database server 1.7 is generally configured as an SQL database, and, besides Mysql, other database systems could be used such as those available from Oracle, Informix, Microsoft, or Sybase. The database server may include one or more databases 1.9. The WMASP 1.4 may also be a multi-server system, such as a web farm.

Figure 2:
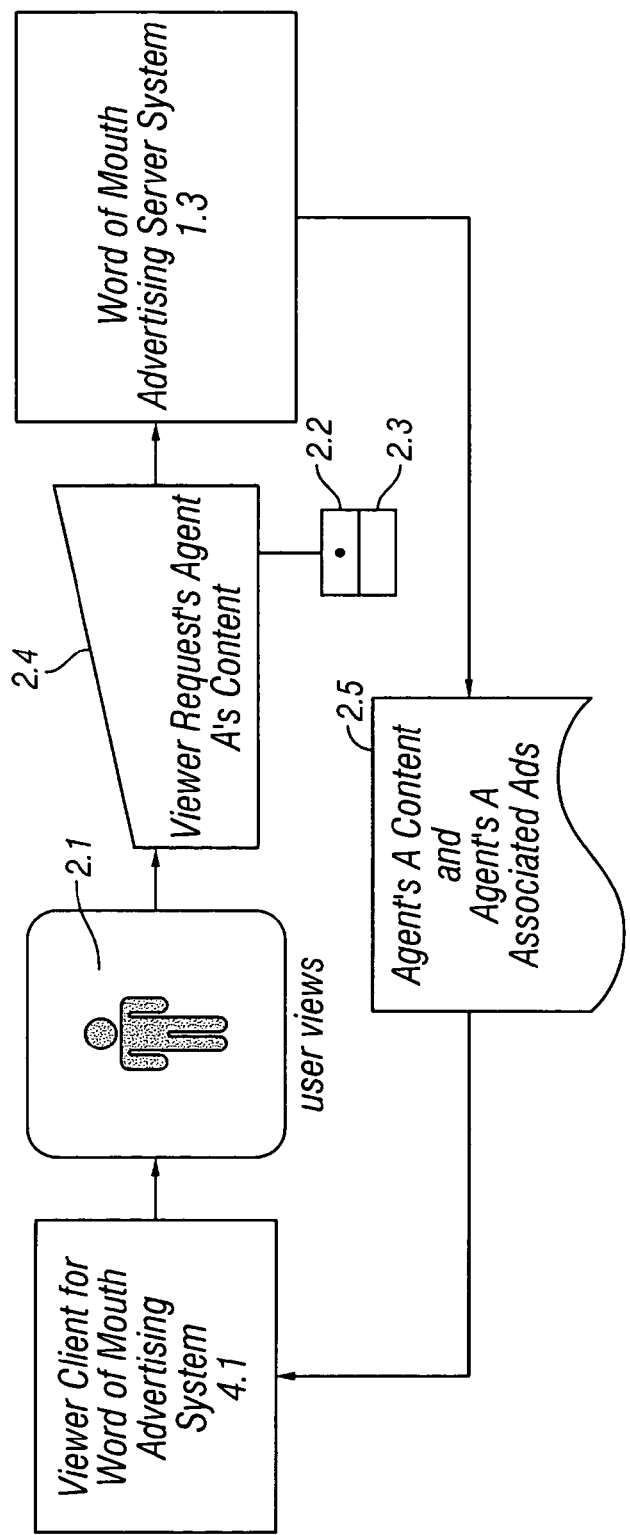
FIG. 2 is a flow chart depicting the high level functionality of a word of mouth advertising system (WMAS) via a communications network in accordance with the present invention.

Referring to FIG. 2, there is generally shown the high level flow by which a viewer 2.1 (also called "user") may receive a word of mouth advertisement 2.5 from a WMASS 1.3. A preferred example of this flow involves a user 2.1 viewing content in a web browser, the web browser acting as the Viewer Client 4.1 for Word of Mouth Advertising System 4.1 (also referred to as "Client Viewer"), which displays a set of friends of a particular user and an option to view their associated web logs, for example. If the user clicks to view the web log of agent a, a request for agent A's content is sent to the WMAS 1.3, as illustrated with reference number 2.4. An Agent or group of agents is illustrated diagrammatically with reference number 2.2 for purposes of illustration of the Agent(s) and groups of Agents discussed herein and content associated with the Agent(s) is illustrated diagrammatically with reference number 2.3 for purposes of illustration of the content associated with an Agent(s) as discussed herein. The WMAS 1.3 processes the request, first receiving it from the web server 1.8, processing the appropriate PHP 1.6, accessing the Mysql database 1.7, 1.9 when necessary, and returning a document 2.5, preferably HTML, containing the requested content and advertisements associated with the agent, for rendering by the client system 4.1, in this case, a browser.

Figure 4:
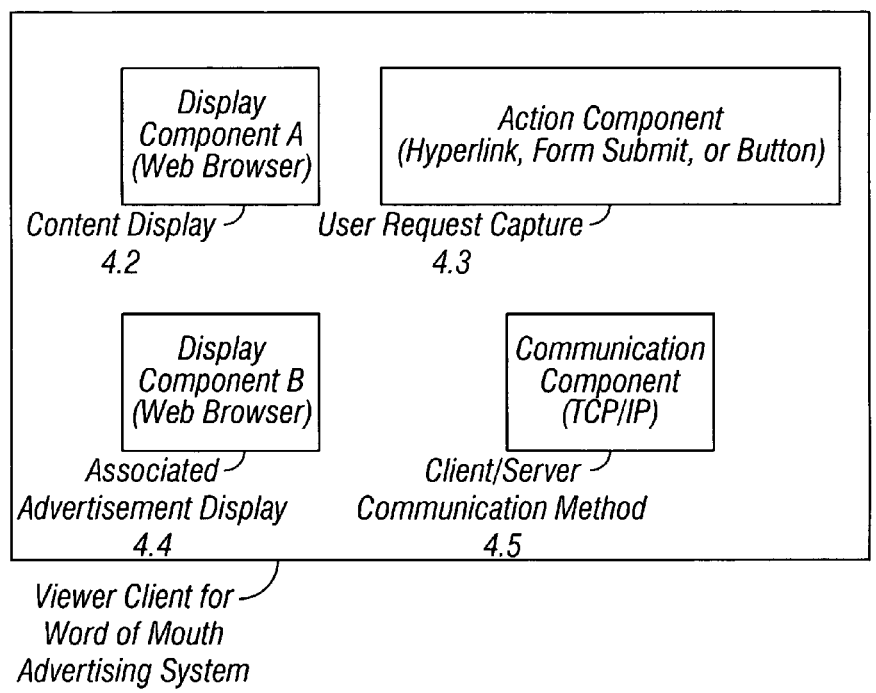
FIG. 4 is a block diagram of a viewer client for a WMAS, in accordance with the present invention.

FIG. 4 depicts the typical components required for a Viewer Client for a Word of Mouth Advertising System (VCWMAS) 4.1. There are displays for two types of information, content 4.2 and advertisements 4.4. It should be apparent that these two types of displays may be rendered by the client 4.1 in the same display, as a web browser does; however, they may be in separate windows in a client application that separates advertisement display from content display, such as commonly done in Kazaa Media Desktop, AOL Instant Messenger, or the iTunes Software Application. An action component 4.3 is activated by the viewer 4.1 to indicate a desire for an agent's content (the viewer 4.1 requests an agent's content as illustrated with reference number 2.4 in FIG. 2). This is typically assisted via the methods (also commonly known as input techniques or devices) that a web browser supports for interaction, such as keyboard input, mouse input, etc, but extends to other methods of interaction such as the utterance of a sound or the touching of a screen or the sending of an Email. Finally the VCWMAS 4.1 requires a method (also common only know as techniques or systems) for communication with a server system 4.5, typically this is TCP/IP used by the web browser.

Figure 3:
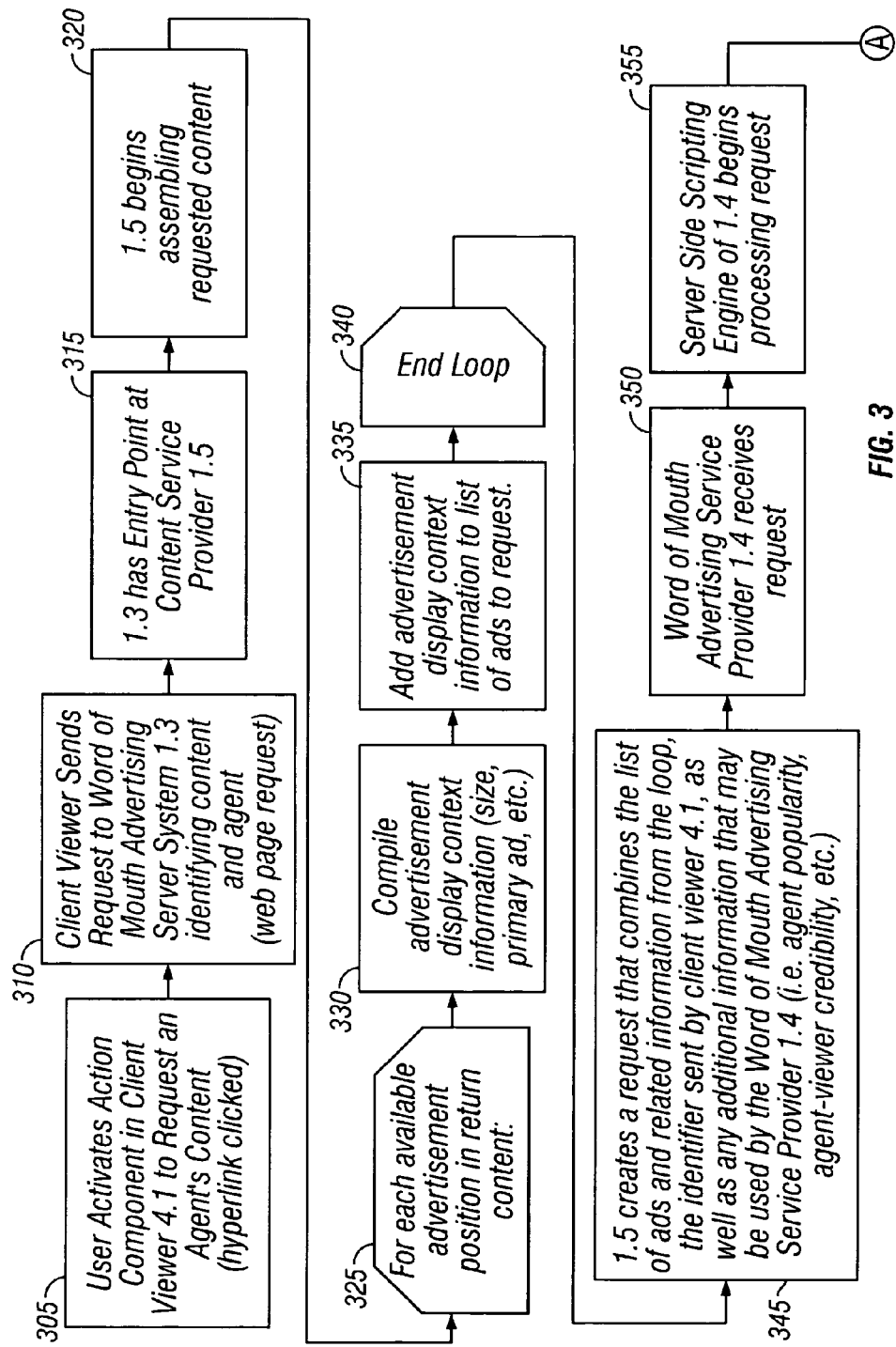
FIG. 3 is a flow chart showing the client-server functionality from when content is requested to when content and associated advertisements are returned as in FIG. 2, in accordance with the present invention.
Figure 3:
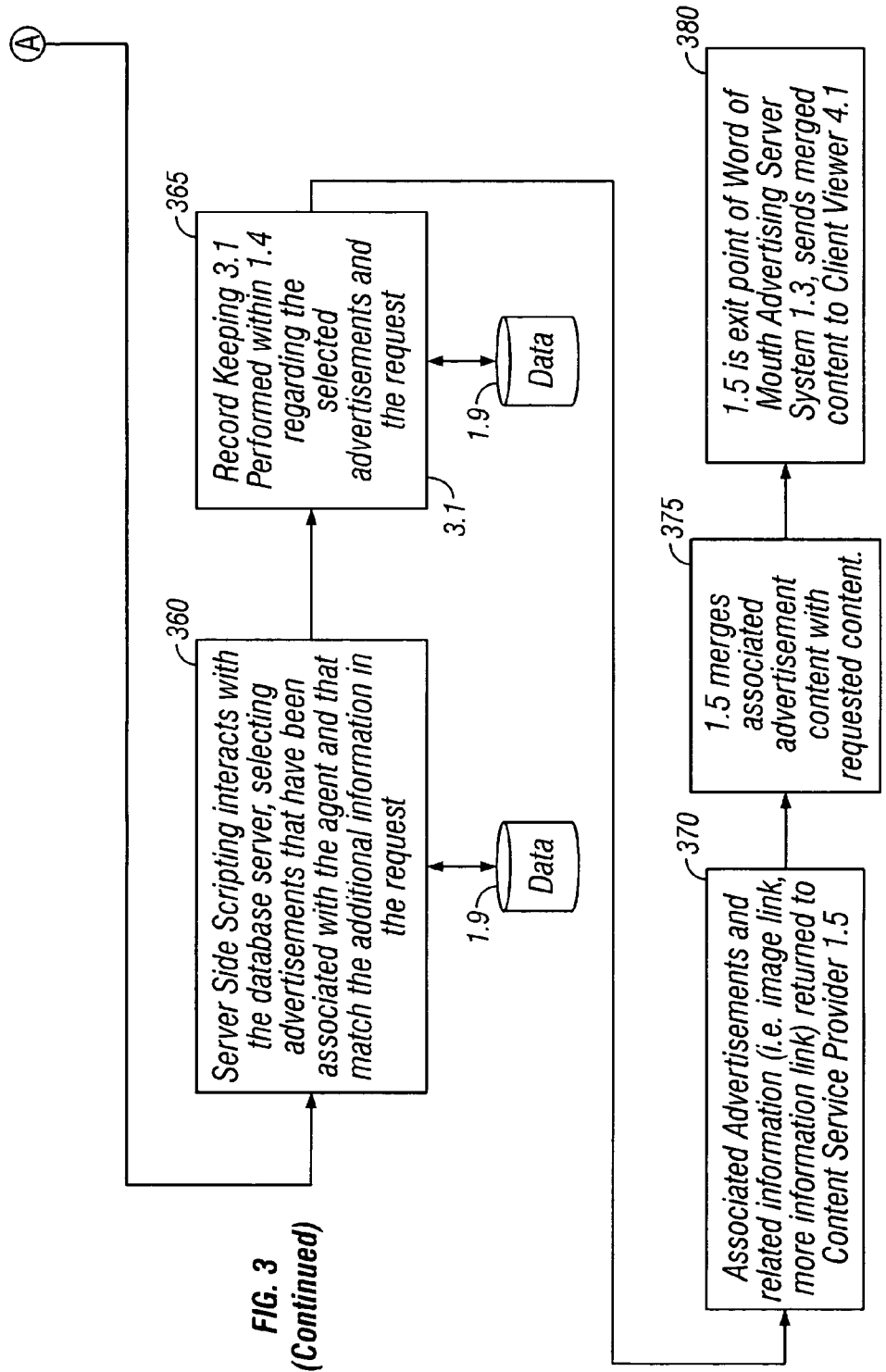

Referring to FIG. 3, an example process for providing word of mouth advertising between a client 1.1 and server system 1.3 is shown in more technical detail. First, a viewing user 2.1 activates a component in a VCWMAS 4.1 that indicates a request for an agent's content (note: for the remainder of the present disclosure herein, an agent may be an individual or an agent may be a group) (illustrated with reference number 310 in FIG. 3 and similarly with reference number 2.4 in FIG. 2). This action is typically the clicking of a hyperlink in a browser, but may be the selection of an icon using another network access system, such as web TV or, the accessing of an individual's music collection in a networked file sharing client via a touch screen system, the accessing of a group's store on an e-commerce site via form submission, or the sending of an email to a server with instructions that enable the server to automatically return content, etc.

The client 1.1 or 4.1 has an associated identifier that represents the content 2.3 that is being requested as well as the agent 2.2 that the content 2.3 is associated with. In a preferred example, this identifier takes the form of two identifiers, a content 2.3 identifier and an agent 2.2 identifier, that was delivered to the web browser via the returned HTML that the client rendered as currently displayed page and is embedded into the link that indicates content by a user. For example, to access Jon's (a hypothetical user's) web log, the link may encode the URL to visit Jon's web log.

Figure 5:
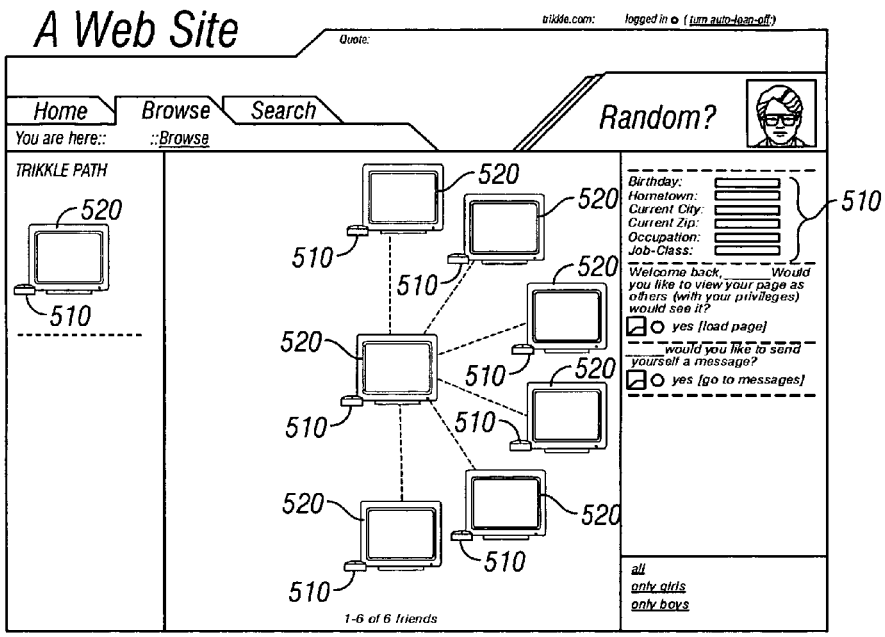
FIG. 5 is an illustration of an example viewer client display prior to invoking the functionality of FIG. 3, in accordance with the present invention.

As illustrated in FIG. 3, the Client Viewer 4.1 sends a request to the WMAS 1.3 identifying desired content and agent, such as in the exemplary web page request (illustrated with reference number 310). Other possible identifiers include email addresses, logins, as well as codes that represent both the content and the agent (which must be decoupled at the server) or codes that have one content and agent identifier for the CSP 1.5 and another content and agent identifier for the WMASP 1.4, etc. It should be clear that the request identifying the content and agent may contain additional information that is required by the server, such as login information, etc. FIG. 5 shows an example of a client display for accessing an agent's content, generally speaking in a state prior to invoking the functionality of FIG. 3. In FIG. 5, an agent is illustrated by way of example with a picture and/or hyperlink. A request would be indicated by a user if they clicked on one of the hyperlinks (510) associated with a person's picture or on the picture itself (520).

The WMAS 1.3, which can include for example a CSP 1.5 and a WMASP 1.4 typically has the CSP 1.5 as the starting point for the processing of the request. In FIG. 3, the entry point of WMAS 1.3 at the CSP 1.5 is illustrated with reference number 315. In a preferred example, the CSP 1.5 and the WMASP 1.4 are run on the same server as part of single application, and inter-server communications are not required. When the web server 1.8 of CSP 1.5 receives the client request in the form of a GET document request and parameters, it runs the PHP server side engine 1.6 on the document requested and the parameters get passed to the PHP engine (for the remainder of the present document herein, when PHP is referenced, it is either called by the web server using a GET or POST command). The step of commencing assembling of the requested content is illustrated with reference number 320 and other steps of the process are illustrated with modules 325, 330, 335 and 340. Although these steps are discussed as a script, any process control can be applied that will generate the desired output information back to the client device 1.1. In an example, the script begins assembling content (320), in this example, Jon's web log by accessing the data associated with Jon's web log in the database system. The programmed script begins to run, creating the output HTML that will ultimately be sent to the client. When an advertisement is to be rendered, the script appends information regarding this advertisement instance to an advertisements variable. Advertisement instance information could include the size of the advertisement space (300×600 pixels), the positioning of the advertisement (top, left, right), the importance of the ad (primary, secondary), etc. After all the advertisements have been appended to the list of advertisements (such as via the steps illustrated with numbers 320 through 340), as illustrated in box 345, the CSP 1.5 creates a request that combines the list of advertisements and related information from the processing loop (such as steps 325, 330, 335, 340), the identifier (such as discussed above) sent by client viewer 4.1, as well as any additional information that may be desired to be used by the WMASP 1.4 (for example agent popularity, agent-viewer credibility, etc.). The WMASP 1.4 receives the request (350) and begins processing (355) in which it is called upon with the list as well as the agent identifier to select the advertisements (in this example, this requires only a PHP function call). As illustrated with reference number 360, server side scripting such as in the WMASP 1.4 interacts with the database server 1.7, selecting advertisements that have been associated with the agent and that match the additional information in the request. In a preferred application, the viewer 4.1 would be logged into the system (i.e. using a cookie/server login authentication scheme) so that the server is aware of his/her identity and may be able to deduce a relationship of the viewer to the agent (i.e. using a networking database) so that these parameters may be passed to the WMASP 1.4 and word of mouth impression record keeping (an example of which is provided in FIG. 16) can be performed. A record keeping module and procedure is illustrated with reference number 3.1 in step 365. Additional information may also be passed to the WMASP 1.4, such as the content being requested and the viewer accessing the content.

Figure 6:
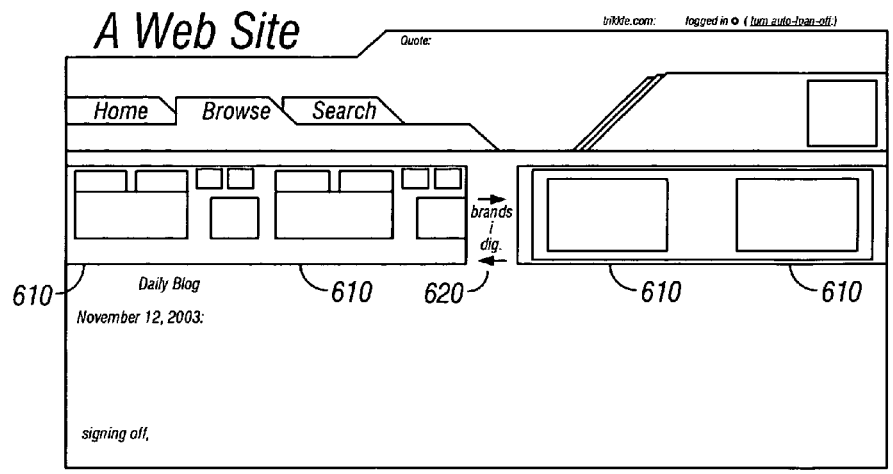
FIG. 6 is an illustration of an example viewer client display after invoking the functionality of FIG. 3, in accordance with the present invention.

The WMASP 1.4 uses the information it receives to return advertisements that match the criteria for all the advertisements requested in the list, as illustrated by way of example with reference numbers 345 through 380. In order to do this, PHP interfaces 1.6 with a Mysql database 1.7 by making SQL queries to locate appropriate data. In a preferred example, PHP 1.6 constructs a query that selects all advertisement identifiers associated with the agent from a database table that has previously been populated with rows of advertisement identifiers and agent identifiers, where a row grouping an advertisement identifier and an agent identifier indicates that the agent has expressly elected to be associated with that advertisement. PHP 1.6 can then run additional, more restrictive queries on this set of advertisement identifiers by looking them up in an advertisement table that lists other features such as size, etc. The CSP 1.5 retrieves the package of advertisement information and merges it with the requested content before sending it back to the client 4.1 as HTML as illustrated in the illustrated portion of the examples with reference numbers 375 and 380. The web browser client then renders the returned HTML. FIG. 6 provides an illustration of the merged content. Note that the advertisements (610) appear on the page and are clearly identified as endorsed by the agent by identifying words (620), such as the words "brands I dig". This is not required, but may make such a system more acceptable, by making it more obvious (i.e. clarifying to users 2.1 of client devices 1.1) that the agent 2.2 is advocating these brands.

Figure 7:
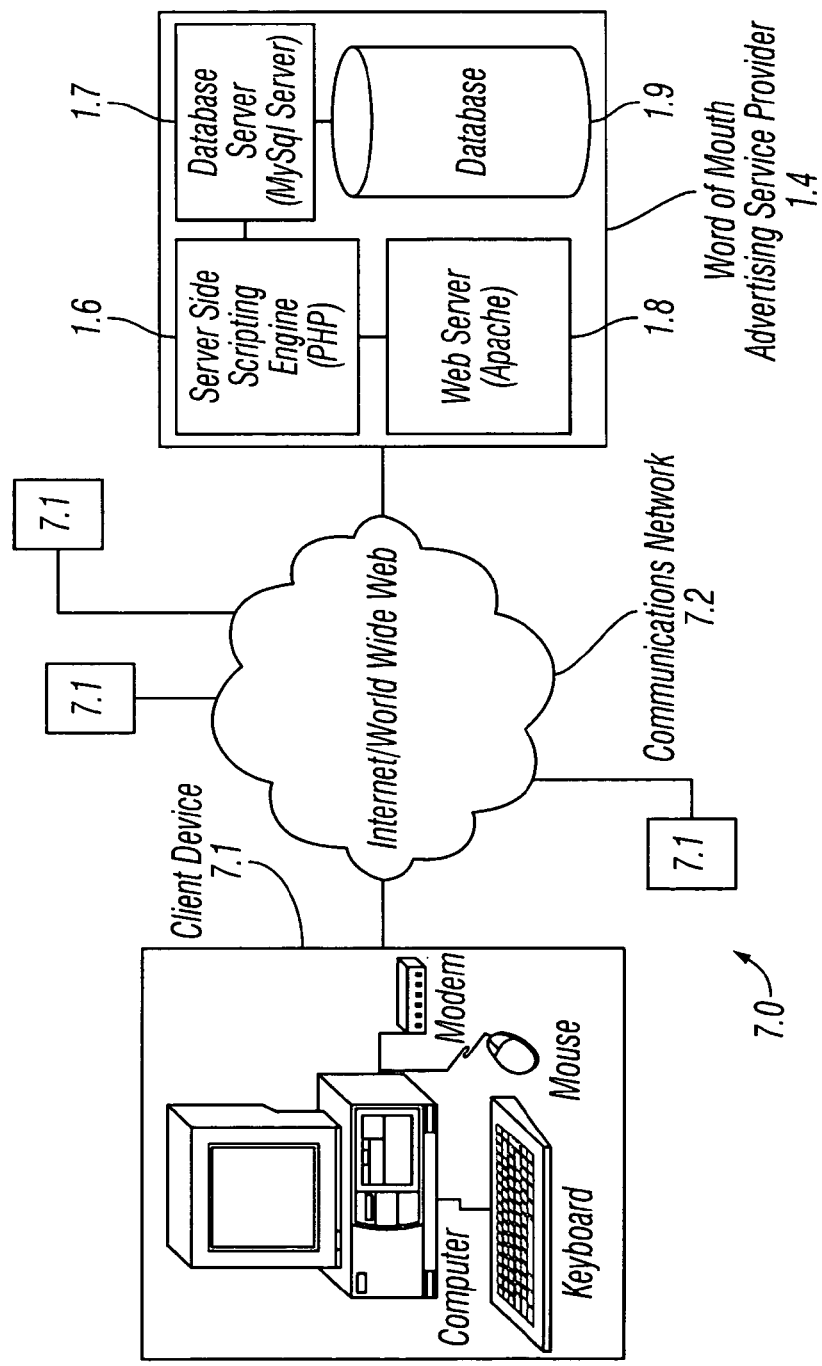
FIG. 7 is a block diagram of an advertisement association system (AAS) for having agents associate the advertisements that they will be associated with in the WMAS, in accordance with the present invention.

Referring to FIG. 7, there is generally shown an advertisement association system via a communications network (AASVCN 7.0) in accordance with the present invention (this also is referred to herein as Advertisement Association System, AAS). The AASVCN 7.0 includes a plurality of client devices 7.1, each of which is coupled to a network 7.2, and, in turn, to a Word of Mouth Advertising Service Provider (WMASP) 1.4. Each client device 7.1, of which one is shown in some detail and three others are represented in block form, is typically a personal computer, such as a Windows-based personal computer. It should be understood that client devices may also be laptops, PDA's, workstations, mobile phones, Internet enabled TV, etc. Each client device 7.1 preferably has an input device such as a keyboard and/or mouse and a display for communication with a user. The client device 7.1 has communications software and a modem (or some other form of Internet connectivity, such as a DSL modem, cable modem, T-1 line, ISDN line, etc). Communications software may be any software suitable for telecommunications, and is preferably browser software. The communications software is for communication over network 7.2 with a WMASP 1.4. Network 7.2 may be, for example, the Internet. Note that this diagram differs from FIG. 1 in that it does not require a CSP 1.5 for delivering content. Also take notice that the Client Devices 7.1 and the Communications Network 7.2 are labeled differently than in FIG. 1, this is used to indicate that they may be different from the items shown in FIG. 1; however, the preferred embodiment uses the same client devices (web browsers) in both the AASVCN 7.0 and the WMASVCN 1.0. The WMASP 1.4 refers to the same object in both the AASVCN 7.0 and the WMASVCN 1.0 and likewise the network 7.2 may be the same network 1.2, as shown in other figures. FIGS. 7, 8, 9, 10, and 11 will show how the WMASP 1.4 populates its storage device with the advertisements that are associated with agents.

Figure 8:
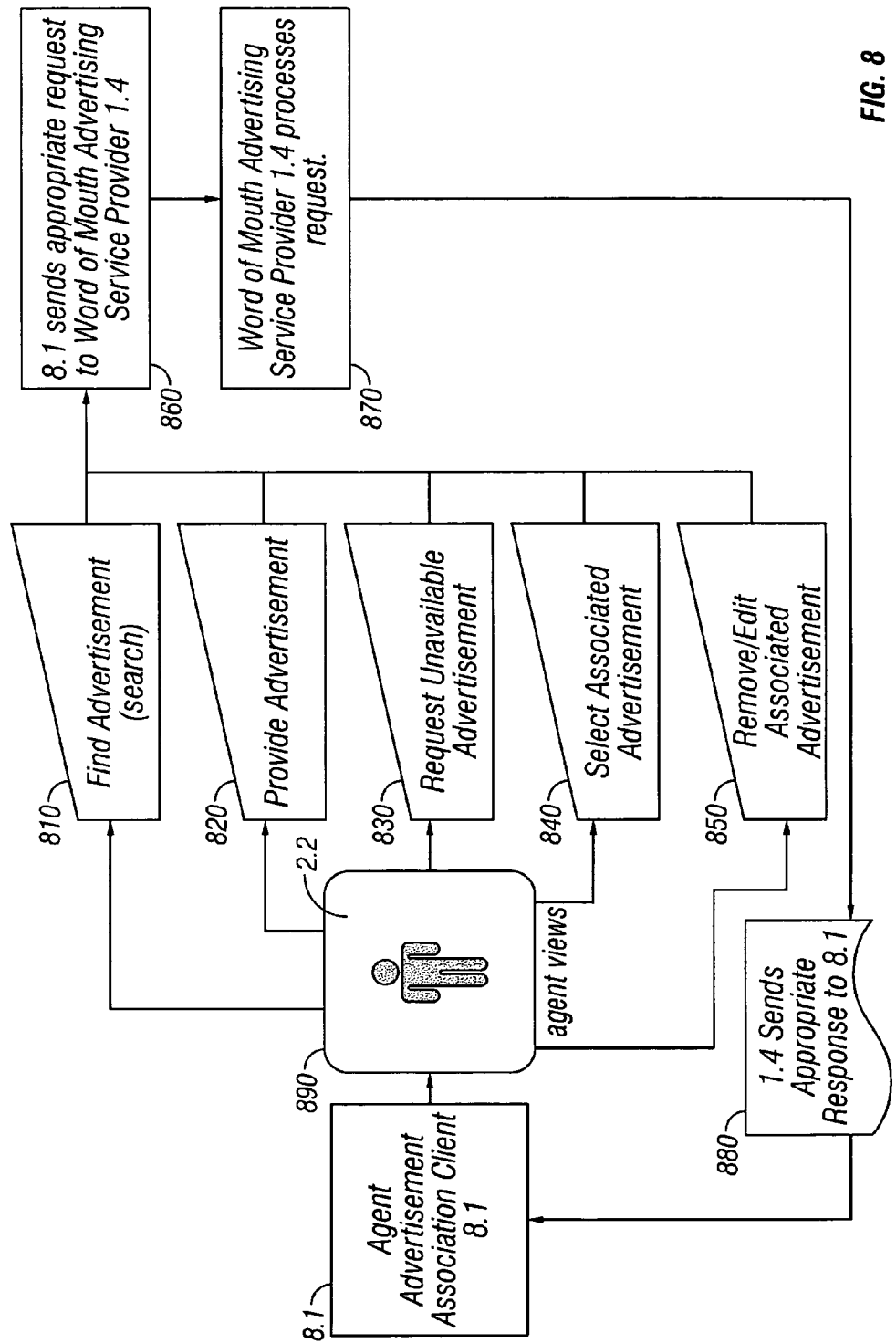
FIG. 8 is a flow chart depicting the high level functionality of the AAS, in accordance with the present invention.

Referring to FIG. 8, there is generally shown the high level flow by which agents 2.2 may associate advertisements with themselves in the AASVCN 7.0. A preferred example of this flow involves an agent 2.2 viewing content in a web browser, the web browser acting as the Agent Advertisement Association Client (AAAC) 8.1, which is used as the interface between the agent and the WMASP 1.4 which returns to the browser HTML documents that provide the agent with a number of separate services, depending on how the agent interacts with them. Typically, an agent will be logged in to the system, with the WMASP 1.4 maintaining the logged in session of the agent during this interaction. It should be appreciated that the agent can be logged on via any type of system for accessing the WMASP 1.4, such as for example via the illustrated client system 7.1, the AAAC operated on the system 7.1. There are a number of known techniques for maintaining session state, such as ASP's session object, Netscape's Cookie technology, or the maintenance of extra parameters in HTML, and these will not be discussed further as they are known in the art and any technique for maintaining a session state can be used. Since the agent 2.2 is logged in to the system, the WMASP 1.4 can identify the agent with a unique identifier, such as an agentID, that is stored in the Mysql database system 1.7 on the WMASP 1.4 and may be assigned separately, during a sign-up procedure, for example. The AASVCN 7.0 generally provides the agent with a number of capabilities illustrated by way of example in FIG. 8, such as the ability to find advertisements (810) amidst a pool of participating advertisers and subsequently select them for association, to provide advertisements to the system (if they do not like the existing ones, for example) (820), to request unavailable advertisements (830) (so that the WMASP 1.4 can try to add this advertiser to the pool), select associated advertisements (840) and to remove or edit the advertisements (850) for which they have associated themselves. As described in FIG. 8, the AAAC 8.1 sends the appropriate request to the WMASP 1.4 (860), the WMASP 1.4 processes the request (870) and sends the appropriate response to the AAAC 8.1 (880). The agent 2.2 operates the AAAC 8.1 as illustrated diagrammatically with box 890 and the text "agent views".

Figure 10:
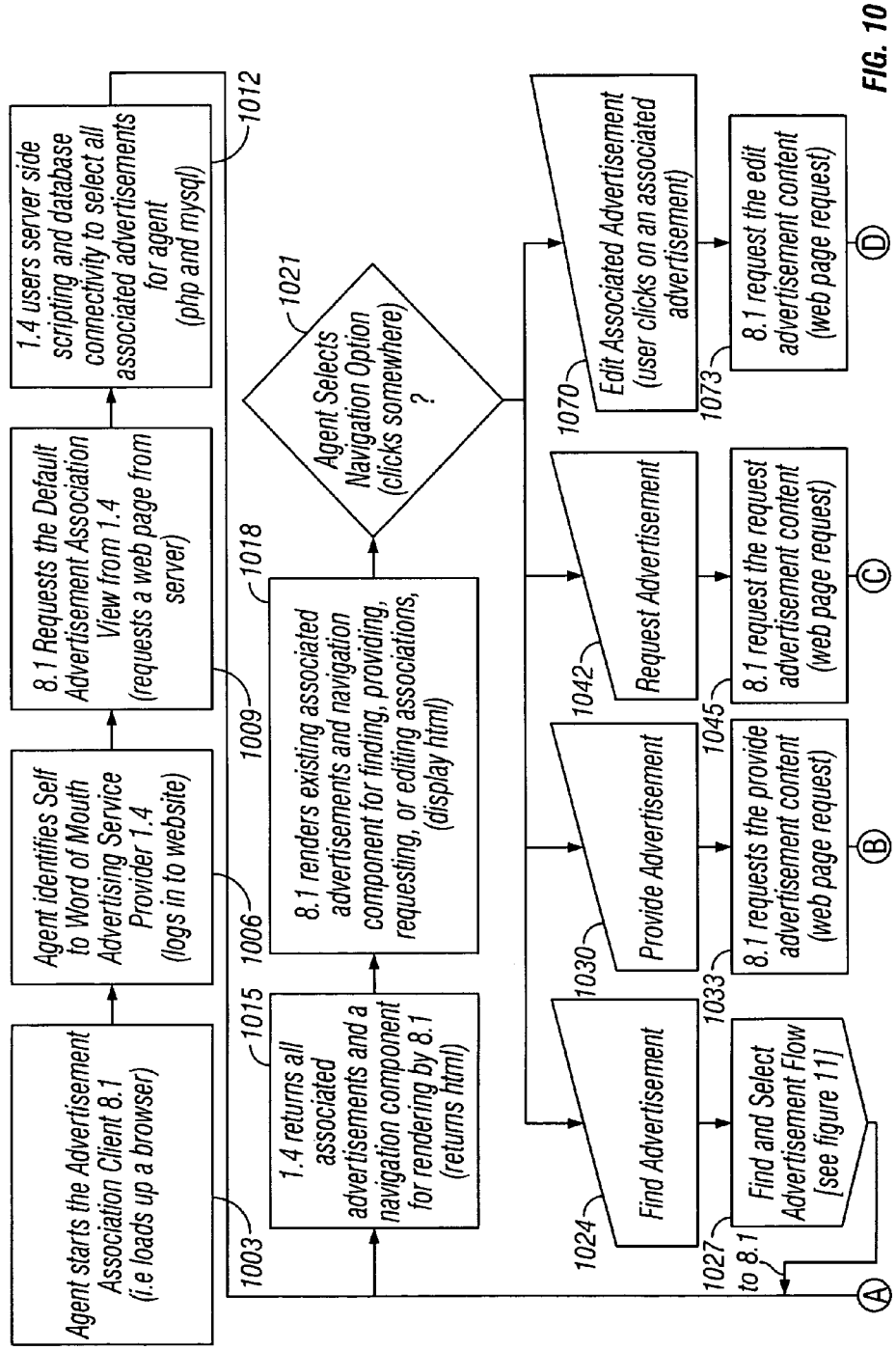
FIG. 10 is a flow chart showing the client-server interactions for the AAS, in accordance with the present invention.
Figure 10:
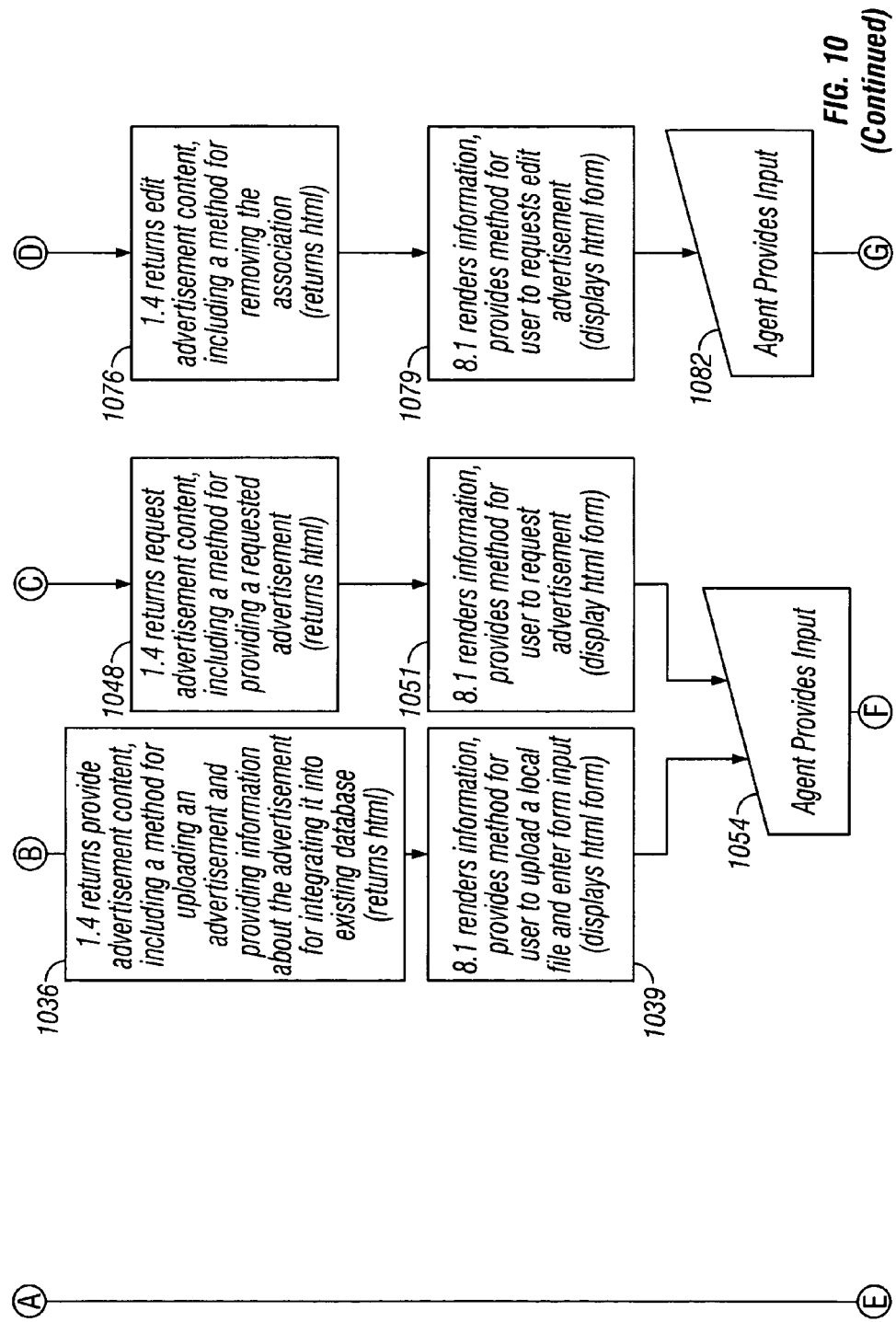
Figure 10:
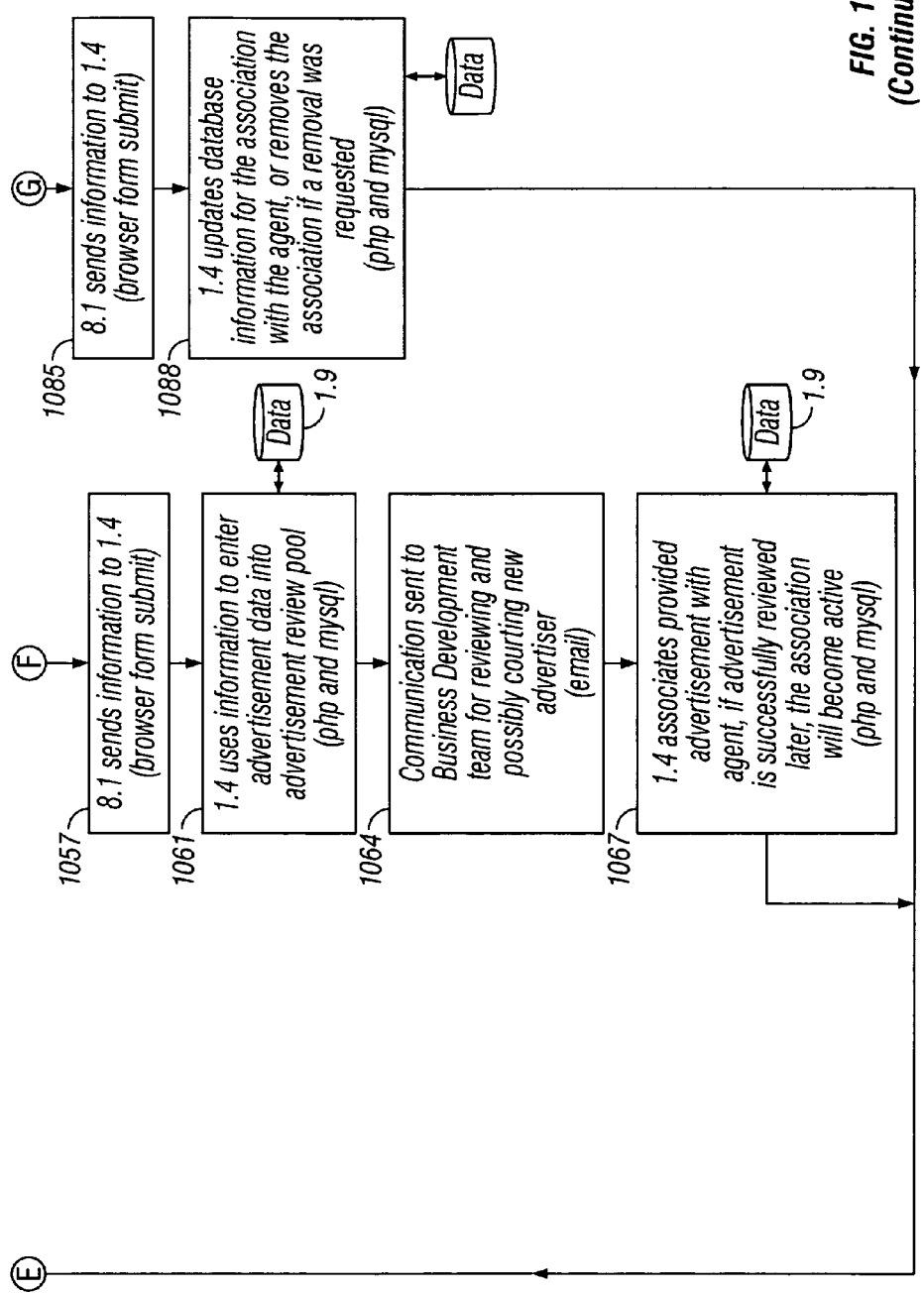

Referring to FIG. 10, there is a preferred example described of a flow of interaction between the AAAC 8.1, the agent 2.2, and the WMASP 1.4, with reference numbers from 1003 through 1088 referring to the reference numbers in FIG. 10. The agent 2.2 begins the client, loading up a web browser (1003). The agent then uses an authentication process, examples of which were provided in the preceding paragraph, to log into the WMASP 1.4 (1006). After login, the WMASP 1.4 will call upon PHP to process the script that returns the default page to the agent (1009), this page typically will look up the agent identifier in the Mysql database using a select SQL command to find the advertisement identifiers that the agent is currently associated with (to the server as a reference point for the agent) (1012). Additional tables may then be referenced to find out more information about the advertisements. The PHP script may also call upon a function which returns the HTML required for displaying a navigation menu that can be used by the user to access the various components of the AASVCN 7.0. With this information, PHP 1.6 can finish creating the dynamically built HTML content and send this back to the AAAC 8.1 for rendering, as illustrated in the box identified with reference number (1015).

Figure 11:
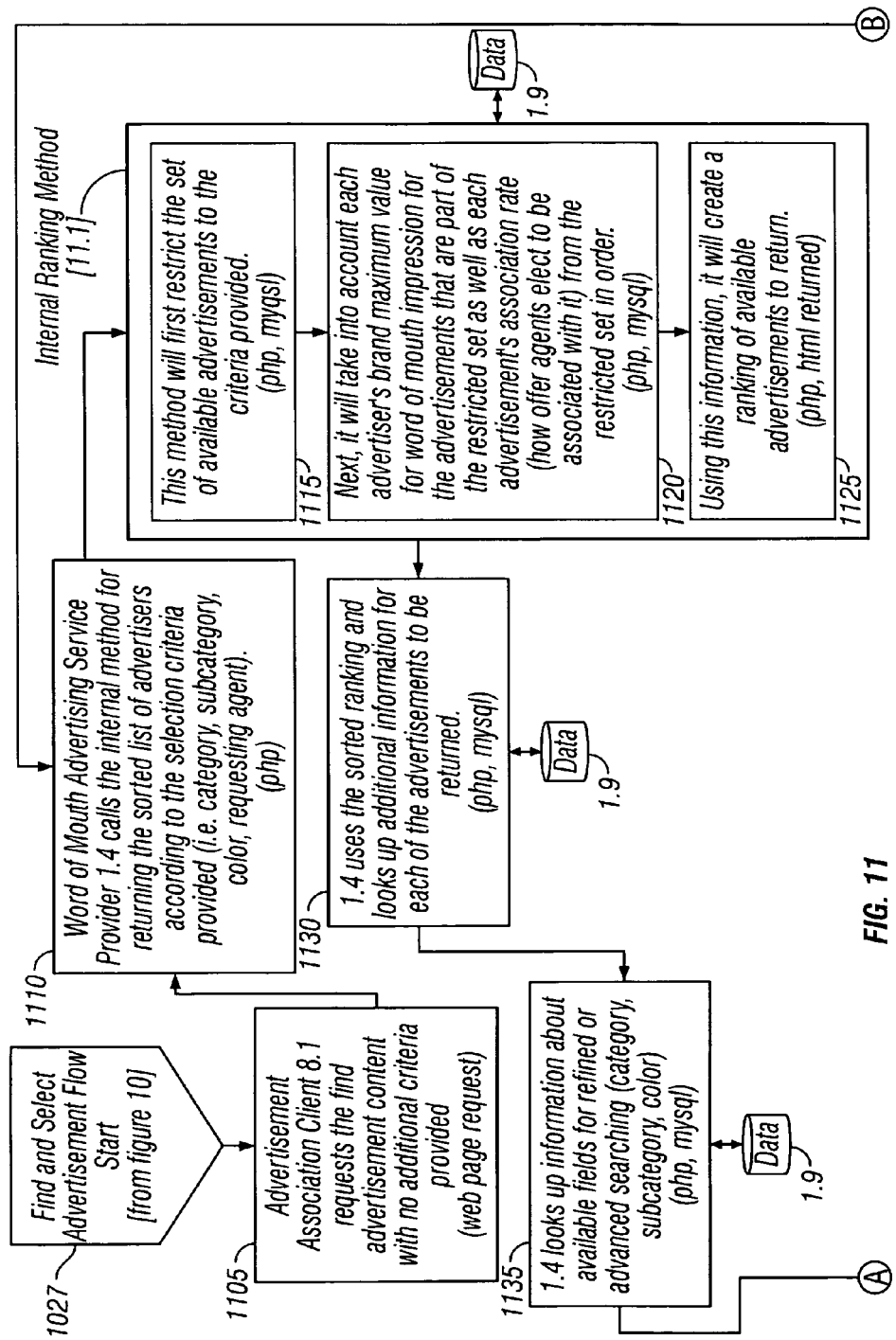
FIG. 11 is a flow chart showing the find component client-server interactions for the AAS in more detail, in accordance with the present invention.
Figure 11:
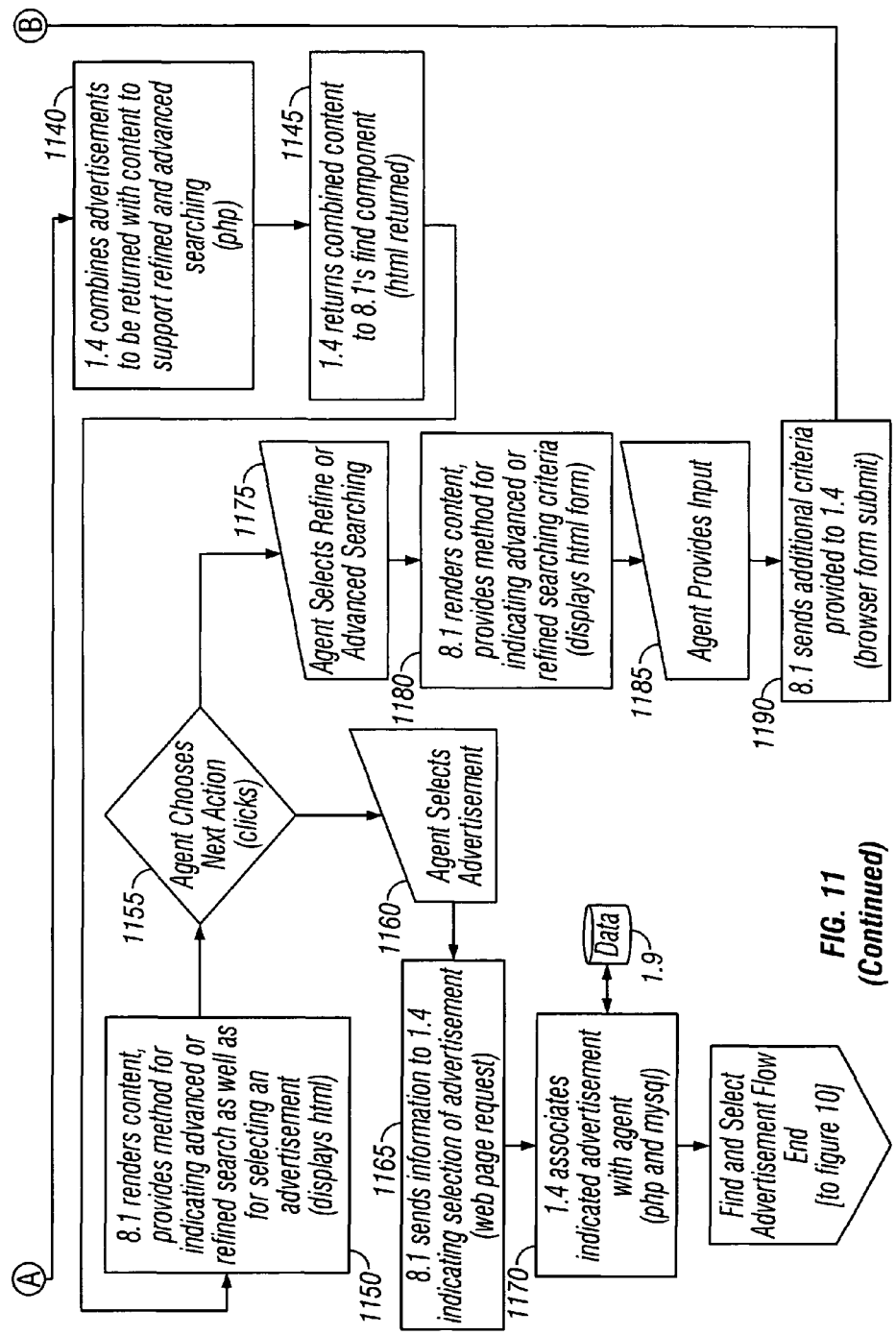

After the browser renders the content (1018) (i.e. AAAC 8.1 displays html or renders existing associated advertisements and navigation component for finding, providing, requesting, or editing associations), the agent 2.2 may navigate the AASVCN 7.0 options by clicking on an appropriate hyperlink (1021). One of these options is the find advertisement option (1024) (also referred to with reference number 810), which is used to locate an appropriate advertisement for association (1027). FIG. 11 describes the find AASVCN 7.0 component (1024) in more detail. If the agent clicks on this option, the AAAC 8.1 sends a request to the WMASP 1.4 for the finder default page (1105), received by the web server which directs the request to the PHP processing engine 1.6 and the appropriate script. The PHP script will call an internal function for determining the sorted list of available brands and their associated ads according to the search criteria passed to the server (1110). In the case of the first access, there are no additional criteria (as illustrated in box 1105). Next, the script will sort all the available brands in the advertisement pool based on their comparative rates for being selected (selection rate) by agents combined with their willingness to pay for selection placement (maximum value per selection), as illustrated with the Internal Ranking Method 11.1 as illustrated in FIG. 11. It should be appreciated that any search criteria passed onto the server can be used, or any combination thereof. Examples are, single search key or multi-key searching, such as searching for people and their associated products or searching for people and their location, or products and associated locations etc.

For example, if there are four brands on the system (each brand campaign may have more than one ad) and their maximum value per selections (this is provided by the advertiser, see FIG. 15) and selection rates (a selection rate is the number of times an ad from this brand campaign was selected divided by the number of times the brand was presented) as follows, and a device similar to a second price blind auction is used to determine the allocation:

Brand Campaign 1:
  12% selection rate, $1.00 maximum value per selection=bid of $0.12;
Brand Campaign 2:
  10% selection rate, $1.30 maximum value per selection=bid of $0.13;
Brand Campaign 3:
  50% selection rate, $0.30 maximum value per selection=bid of $0.15;
Brand Campaign 4:
  05% selection rate, $1.00 maximum value per selection=bid of $0.05;

The resulting allocation may be Brand Campaign 3 in position 1, having a cost of word of mouth impression of $0.13 (the bid of next available bidder), Brand Campaign 2 in position 2, having a cost of $0.12, Brand Campaign 1 in position three having a cost of $0.05, and Brand Campaign 4 dropped because it is in last place.

The PHP script accesses these values by performing appropriate select queries on the Mysql database system. The insertion of these values into the database is part of a separate process, which is described later. An example of the Internal Ranking Method 11.1 is illustrated with reference numbers 1115, 1120 and 1125.

After the ranking has been received, PHP may also look up additional information regarding the advertisements in the ranking, such as their popularity, web links, image, identifiers, etc by performing appropriate Select queries on the Mysql database (1130). PHP may also extract additional information from Mysql to garner the appropriate HTML for returning options supporting advanced searching and refined searching techniques (1135). When the script is done processing, the dynamic output HTML has been created and the web server sends it back to the client, where it is rendered. By way of the illustrated example, WMASP 1.4 combines advertisements to be returned with content to support refined and advanced searching (1140), it returns combined content to a find component of AAAC 8.1 (1145) and the AAAC 8.1 renders the content, provides a method for indicating advanced or refined searching as well as for selecting an advertisement (1150).

At this point, the agent 2.2 may either perform more searching by refining the search or selecting advanced search, or they may decide to associate with one of the advertisements of a Brand Campaign (i.e. choosing next action such as by clicking (1155)). If association is selected (1160) (by clicking on an appropriate link), the client 8.1 sends a request to the WMASP 1.4 indicating this including the agent and the advertisement identifier (1165), PHP will process the request and store the association in the Mysql database. In the illustrated example, WMASP 1.4 associates the indicated advertisement with an agent (1170) and optionally processing can return to the agent option selection screen on AAAC 8.1 (illustrated with box 8.1 in FIG. 8) or to processing illustrated in FIG. 10, such as at step 1018 by way of example. If the agent selects advanced searching options (1175) such as the restriction of the advertisements to a specific category and then submits the search, the client 8.1 will pass the criteria to the WMASP 1.4, which will have a new step that preprocess the set of available advertisements to match this criteria before performing the ranking (1180). Optionally, the Agent can provide further input (1185) and the AAAC 8.1 returns processing such as by sending the additional criteria to the WMASP 1.4 FIG. 9 depicts an illustration of a sample find-and-associate-client display.

Figure 9:
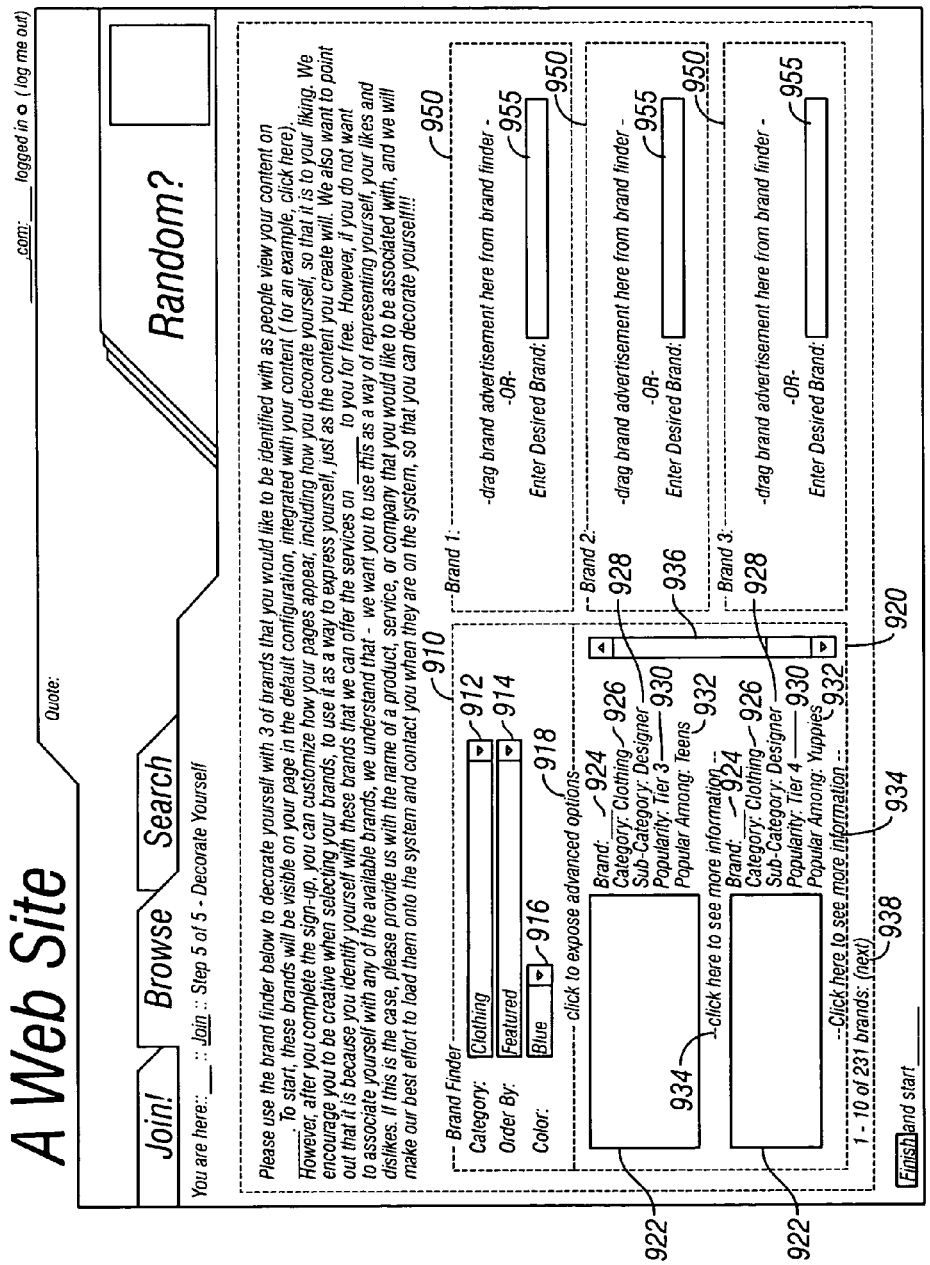
FIG. 9 is an illustration of an example advertisement association client display, in accordance with the present invention.

As illustrated in FIG. 9, examples of various search and selection options are provided. By way of example, an agent can use a brand finder tool (910) to specify search criteria. Examples of search criteria are category (912), priority ordering preferences (914) and color (916). Further options can be provided via an advanced options tool (918) that can be selected such as via clicking. The agent 2.2 can select desired advertisements such as via selecting advertisements displayed in an advertising display area (920). Various features of the advertised item can be displayed, such as an illustration of the item or the advertisement (922), the brand name or other identifier (924), category (926), a sub-category or further category (928), popularity rating (930), demographic information (932), etc. Optionally additional information can be requested, such as via selection of an additional information tool (934). Additional brands can be displayed in the advertising display area (920), such as via operation of a scrolling tool (936) or selection of an additional brands display tool (938). Brands or ads optionally can be selected by dragging and dropping operations, such as by dragging a selected brand or advertisement from the advertising display area (920) into a brand selection location (950). An alternative selection technique is to type or otherwise enter characters corresponding to the desired brand or ad via a brand specification tool (955).

In addition to this type of find component, the WMASP 1.4 may include a separate or integrated find component that displays featured advertisements as well as targeted advertisements, services for which advertisers may pay premiums in order to access a specific type or agent or more agents. The targeted component requires a separate system for advertisers specifying target criteria about an agent that the WSMASP 1.4 can track.

Another means for finding advertisements treats viewers 2.1 as potential agents 2.2, allowing them to associate themselves with advertisements as they are interacting with a WMASVCN 1.0, similar to a way a viewer would shop for products, i.e. using a shopping cart or clicking on an activator next to the advertisement that automatically associated it with the viewer.

Another option of the AASVCN 7.0 is the ability to provide an advertisement (illustrated with reference numbers 1030 and 820, and associated operations 1033, 1036 and 1039), which shares much of the functionality with the ability to request an advertisement (illustrated with reference numbers 1042 and 830 and associated operations 1045, 1048 and 1051). If the agent selects either of these options, the client submits a request to the WMASP 1.4 for the default HTML for the client to render (1033, 1045), which typically includes empty form elements that the agent can use for providing or requesting an advertiser or advertisement. After the client receives and renders this form (1036, 1039 or 1048, 1051), and after the agent fills out the form (i.e. provides input) and submits it (i.e. sends to the WMASP 1.4) (1054, 1057), the WMASP 1.4 will receive the form and process it with PHP, creating a request for a new advertisement such as by using the information provided to enter the advertisement data into an advertisement review pool (1061) that is stored in the Mysql database 1.9 and routed to the business development team for review and possibly courting a new advertiser (1064) before becoming incorporated into the WMASP 1.4 (1067) such as by associating the provided advertisement with the specific agent(s), and if the advertisement is successfully reviewed later, the association becomes active.

The AASVCN 7.0 also includes the ability to edit or remove an associated advertisement (1070 and 850). In this scenario, the agent would click on the advertisement association that should be edited and the client would submit the advertisement identifier and the agent identifier to the server (i.e. requests the edit advertisement content, 1073), where PHP would create the dynamic HTML content required for editing the association before sending the HTML back to the client for rendering (i.e. the WMASP 1.4 returns edit advertisement content, including an option for removing the association (1076)). The AAAC 8.1 renders information, provides a facility for the user to request editing of advertisements, such as displaying an html form (1079). After the agent updates fields in the form and submits the form back to the server (i.e. agent provides input (1082) and client 8.1 sends information to WMASP 1.4, a browser form submit), PHP of the WMASP 1.4 would process the submitted form and interact with the Mysql database to update the association or remove it completely (i.e. WMASP 1.4 updates database information for the association with the agent, or removes the association if a removal was requested (1088)).

Figure 12:
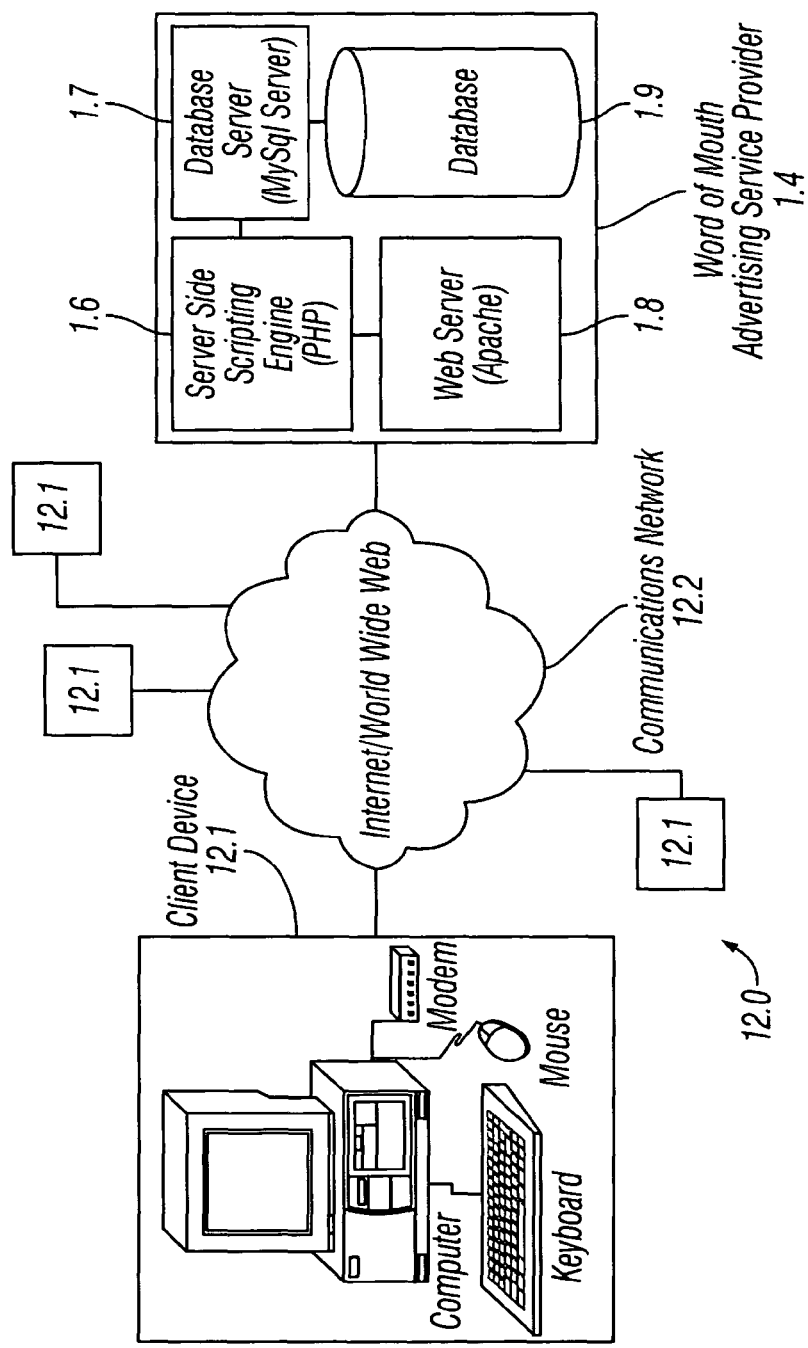
FIG. 12 is a block diagram of a word of mouth advertisement brand management system (WMABMS) for having advertisers manage their advertisements, in accordance with the present invention.

Referring to FIG. 12, there is generally shown Word of Mouth Advertising Campaign Management System via a Communications Network (WMACMSVCN) 12.0 in accordance with the present invention (this also is referred to herein as a Word of Mouth Advertisement Brand Management System, WMABMS). The WMACMSVCN 12.0 includes a plurality of client devices 12.1, each of which is coupled to a network 12.2, and, in turn, to a Word of Mouth Advertising Service Provider (WMASP) 1.4. Each client device 12.1, of which an example of one is shown in some detail and three others are represented in block form, is typically a personal computer, such as a Windows-based personal computer. It should be understood that client devices may also be laptops, PDA's, workstations, mobile phones, internet enabled TV, etc. Each client device 12.1 preferably has an input device such as a keyboard and/or mouse and a display for communication with a user. The client device 12.1 has communications software and a modem (or some other form of Internet connectivity, such as a DSL modem, cable modem, T-1 line, ISDN line, etc). Communications software may be any software suitable for telecommunications, and is preferably browser software. The communications software is for communication over network 12.2 with a WMASP 1.4. Network 12.2 may be, for example, the Internet. Note that this diagram differs from FIG. 1 in that it does not require a CSP 1.5 for delivering content. Also take notice that the Client Devices 12.1 and the Communications Network 12.2 are labeled differently than in FIGS. 1 and 5, since this is used to indicate that they may be different from the items shown in FIGS. 1 and 5; however, the preferred embodiment uses the same client devices (web browsers) in the AASVCN 7.0, the WMASVCN 1.0, and the WMACMSVCN 12.0, likewise the network 12.2 may be the same network 1.2, 7.2 as shown in other figures. The WMASP 1.4 preferably is the same object in all of these, all three components representing the different roles of the system (agent, advertiser, and viewer).

Figure 13:
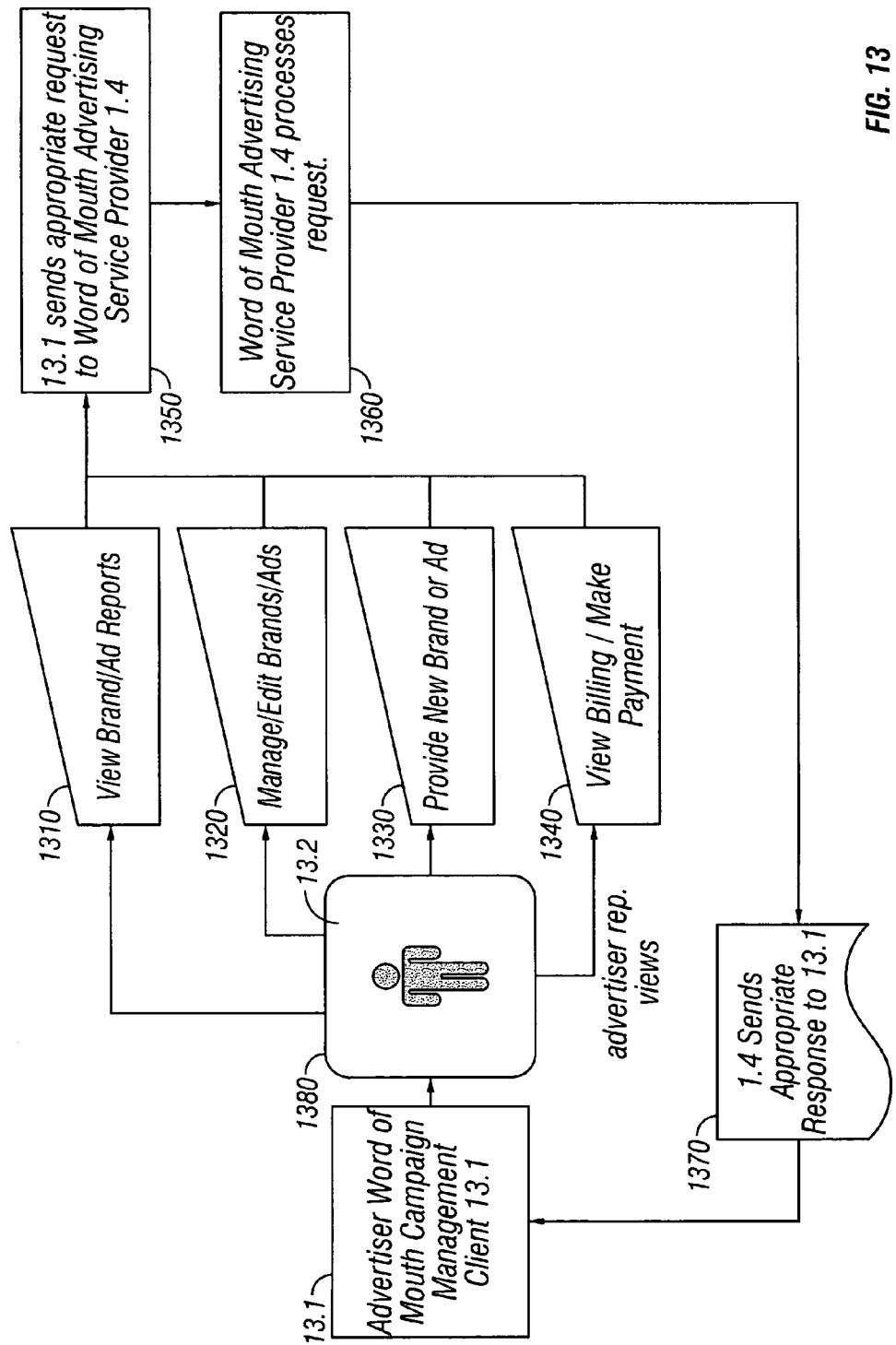
FIG. 13 is a flow chart depicting the high level functionality of the WMABMS, in accordance with the present invention.
Figure 14:
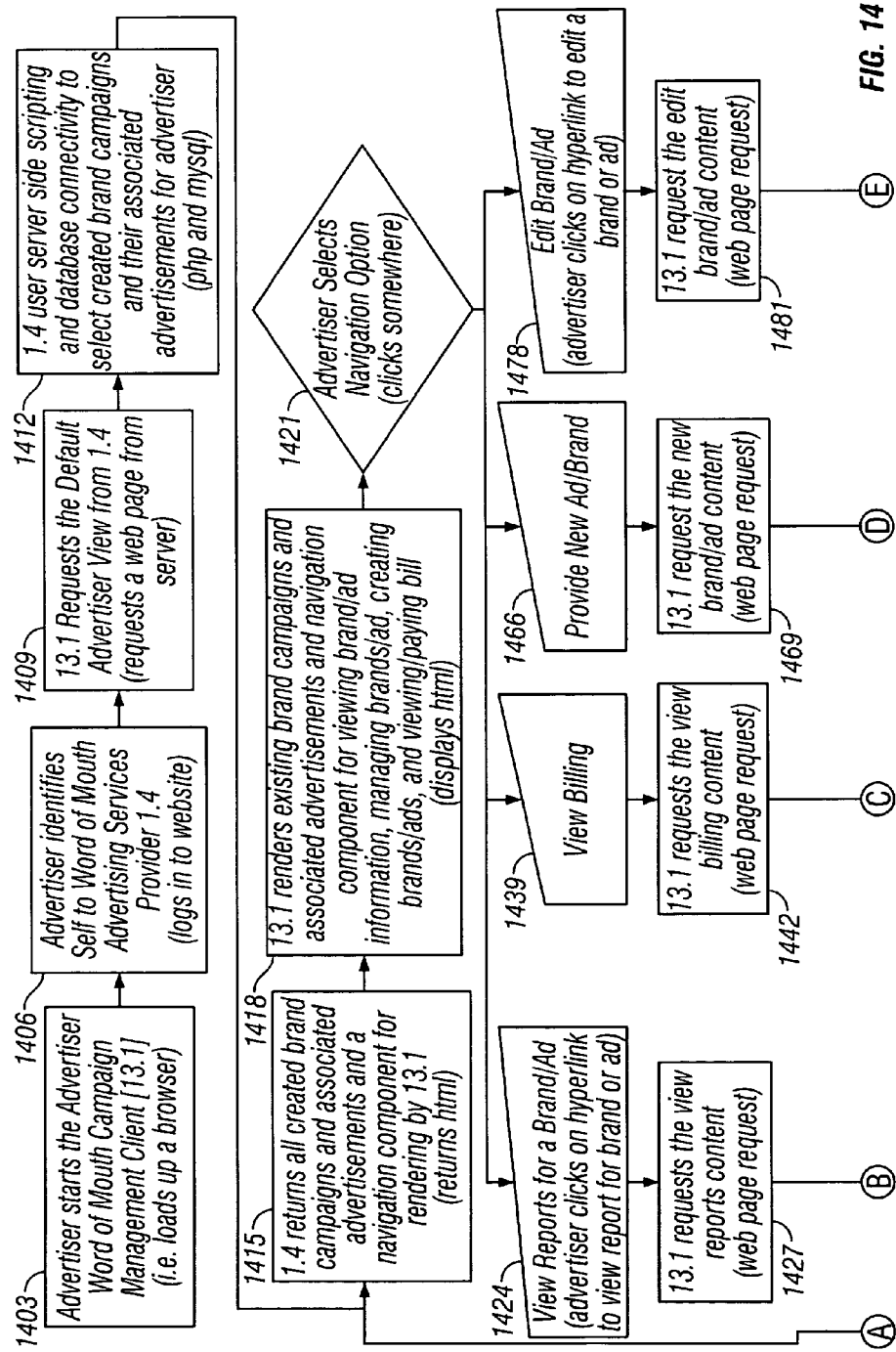
FIG. 14 is a flow chart showing the client-server interactions for the WMABMS, in accordance with the present invention.
Figure 14:
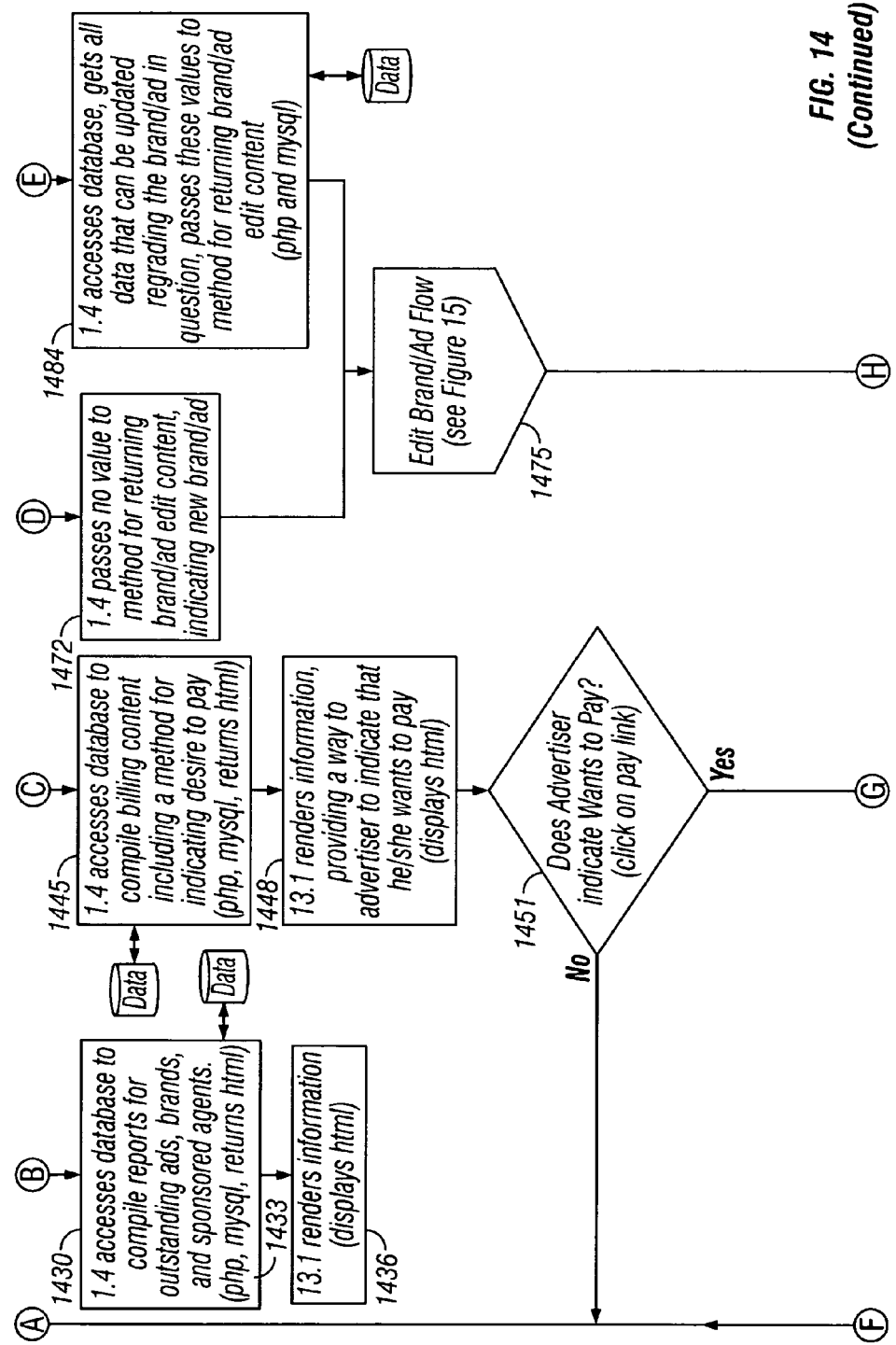
Figure 14:
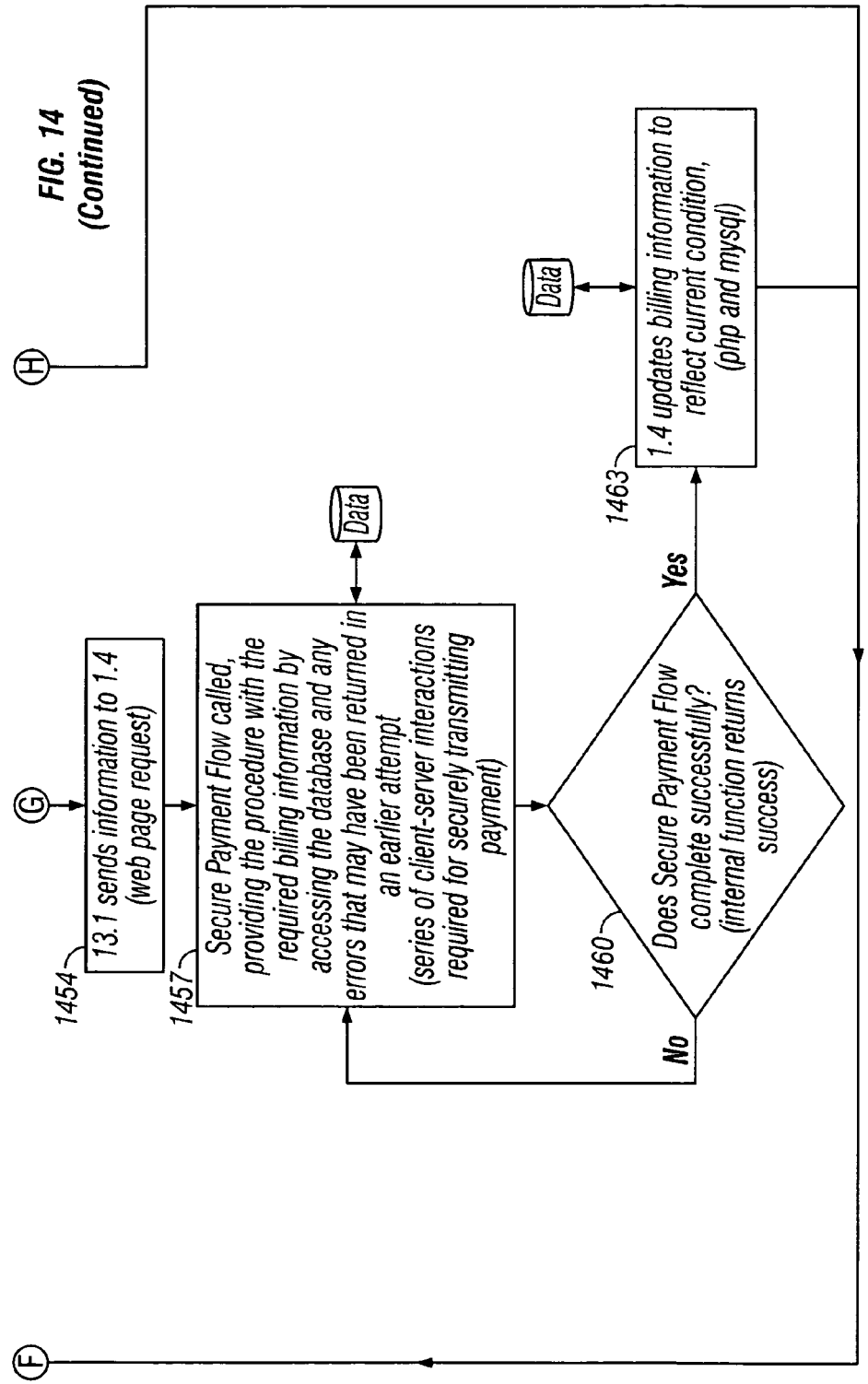
Figure 15:
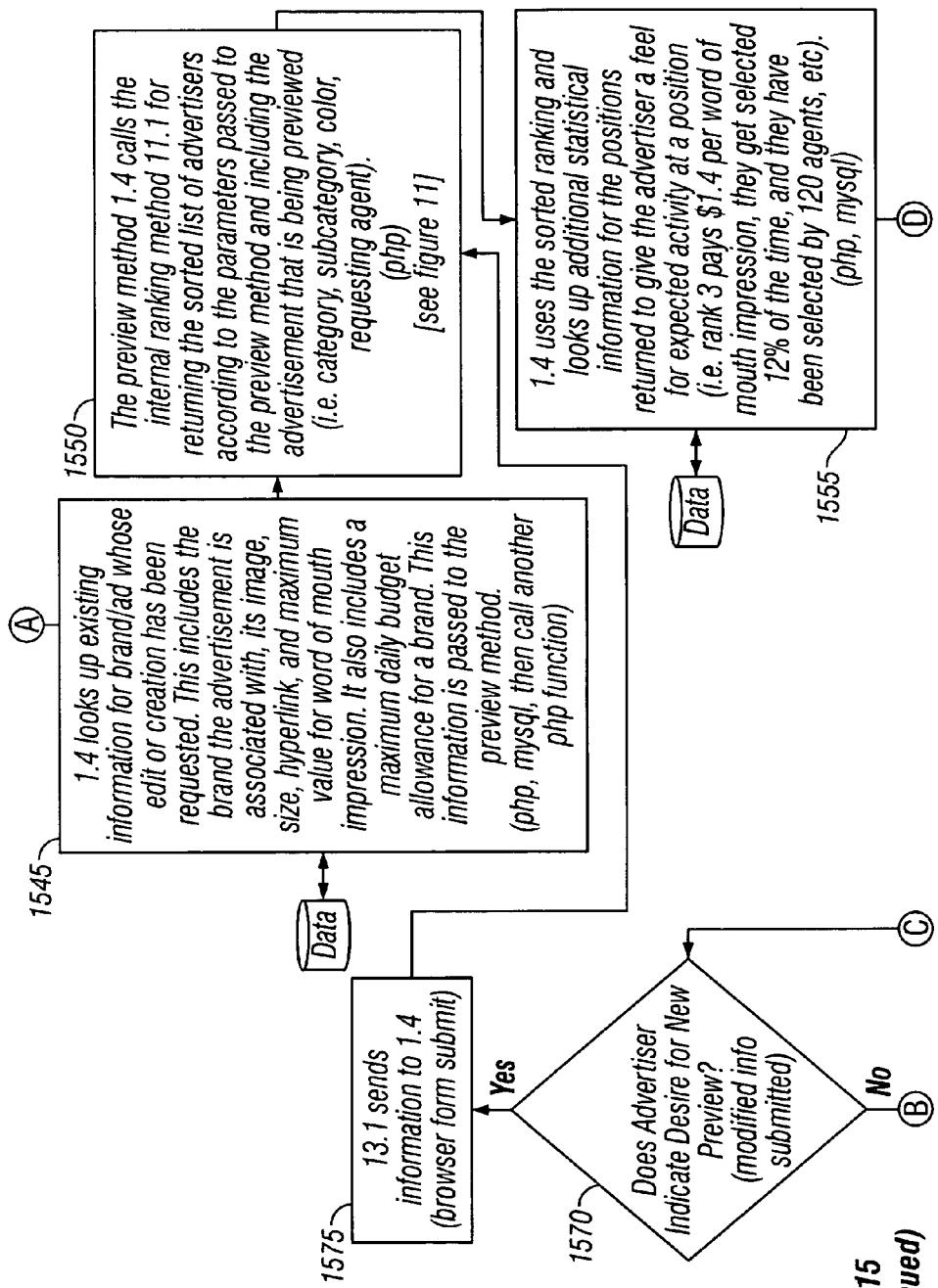
FIG. 15 is a flow chart showing the edit ad/brand client-server interactions for WMABMS, in accordance with the present invention.
Figure 15:
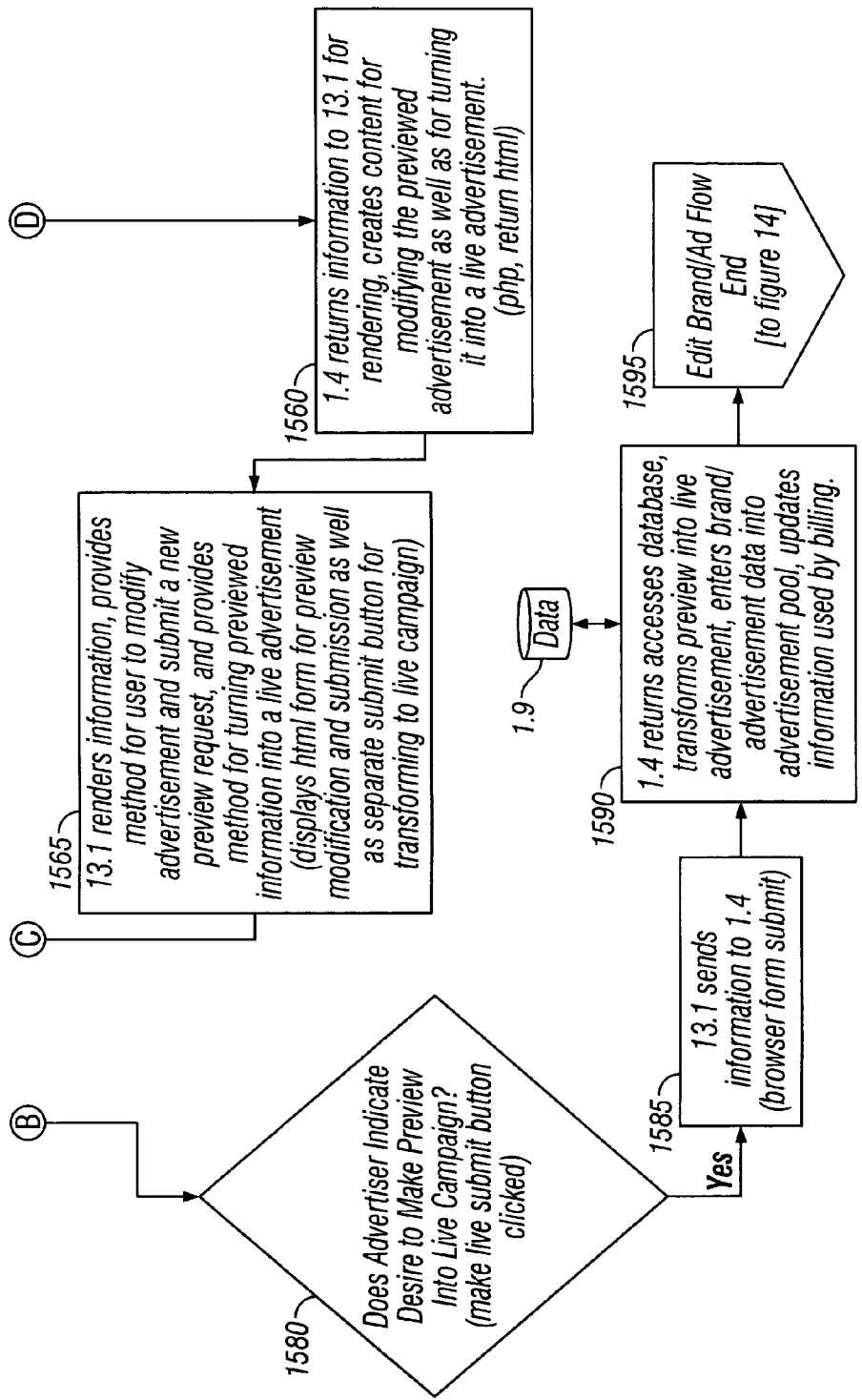

Referring to FIG. 13, there is generally shown the high level flow by which advertisers may manage campaigns in the WMACMSVCN 12.0. A preferred example of this flow involves an advertiser (an advertiser representative is shown as a stylized figure with reference number 13.2, although it should be understood that any type of advertiser can be referenced) viewing content in a web browser, the web browser acting as the Advertiser Word of Mouth Campaign Management Client (AWMCMC) 13.1, which is used as the interface between the advertiser and the WMASP 1.4 which returns to the browser HTML documents that provide the advertiser with a number of separate services, depending on how the advertiser interacts with them. Typically, an advertiser will be logged in to the system, with the WMASP 1.4 maintaining the logged in session of the agent during this interaction. It should be appreciated that the advertiser can be logged on via any type of system for accessing the WMASP 1.4, such as for example via the illustrated client system 12.1, the AWMCMC 13.1 operated on the system 12.1. There are a number of known techniques for maintaining session state, such as ASP's session object, Netscape's Cookie technology, or the maintenance of extra parameters in HTML, and these will not be discussed further as they are known in the art and any technique for maintaining a session state can be used. Since the advertiser 13.2 is logged in to the system, the WMASP 1.4 can identify the advertiser with a unique identifier, such as an advertiserID, that is stored in the Mysql database system 1.7 on the WMASP 1.4 and may be assigned separately, during a sign-up procedure, for example. The WMACMSVCN 12.0 generally provides the advertiser with a number of capabilities illustrated by way of example in FIG. 13, such as the ability to provide new brand campaigns or ads to the system (1330), to manage or edit these brands or ads (1320), to view billing or make a payment (1340), or to view extensive reporting (1310), such as to view brand/ad reports. As described in FIG. 13, the AWMCMC 13.1 sends the appropriate request to the WMASP 1.4 (1350), the WMASP 1.4 processes the request (1360) and sends the appropriate response to the AWMCMC 13.1 (1370). The advertiser 13.2 operates the AWMCMC 13.1 as illustrated diagrammatically with box (1380) and the text "advertiser rep. views". FIGS. 14 and 15 show the process in more detail.

In order to create a campaign, the advertiser first creates a brand campaign; for example, Nike. Then the advertiser begins to add advertisements to this brand. Perhaps there is one of the Nike Swoosh, one of an athlete, and one of a track. After the advertiser uploads this information to the WMASP 1.4, the advertiser begins the process of choosing categories to add this brand to. For each category, (i.e. clothing, general), the advertiser chooses a value for maximum value for selection which will be used in the process of determining the relative placement of a brand within the finder component when an agent is looking for advertisements to be associated with. The actual placement will also incorporate the selection ratio, as a means for insuring that advertisers are targeting their brands to appropriate categories (i.e. if Nike put their brand in jewelry, less people searching that class would select them because the people would be looking for jewelry brands, therefore the system would, as a result of the algorithms in place, migrate them lower in the ranking).

Referring to FIG. 14, there is a preferred example described of a flow of interaction between the AWMCMC 13.1, the advertiser's representative(s) 13.2, and the WMASP 1.4, with reference numbers from 1403 through 1484 referring to the reference numbers in FIG. 14. First the advertiser 13.2 begins the client, loading up a web browser (1403). The advertiser then uses an authentication process, to log into the WMASP 1.4 (1406). After login, the WMASP 1.4 will call upon PHP to process the script that returns the default page to the advertiser (1409), this page typically will look up the advertiser identifier in the Mysql database using a select SQL command to find the created brand campaign identifiers and advertisement identifiers that the advertiser is currently associated with (1412). Additional tables may then be referenced to find out more information about the brand campaigns and/or associated advertisements. The PHP script may also call upon a function which returns the HTML required for displaying a navigation menu that can be used by the advertiser to access the various components of the WMACMSVCN 12.0. With this information, PHP 1.6 can finish creating the dynamically built HTML content and send this back to the AWMCMC 13.1 for rendering, as illustrated in the box identified with reference number 1415.

After the browser renders the content 1418 (i.e. AWMCMC 13.1 displays html or renders existing brand campaigns and associated advertisements and navigation component for viewing brand and/or ad information, managing the brands/ads, and viewing/paying bills), the advertiser 13.2 may navigate the WMACMSVCN 12.0 options by clicking on an appropriate hyperlink 1421. Various options are available. The illustrated examples provided in FIGS. 13, 14 and 15 are not exhaustive, but include the following. One example is viewing reports for a brand and/or advertisement in which an advertiser clicks on a hyperlink to view the report for the brand or ad. This example is shown with reference numbers 1310 and 1424, and associated reference numbers 1427, 1430, 1433 and 1436, and associated text, which is incorporated herein by reference. Another example is to view billing and/or make payments. This example is shown with reference numbers 1340 and 1439, and associated reference numbers 1442, 1445, 1448, 1451, 1454, 1457, 1460 and 1463 and associated text, which is incorporated herein by reference. A further example is to provide a new advertisement and/or brand. This example is shown with reference numbers 1330 and 1466, and associated reference numbers 1469, 1472 and 1475 and associated text, which is incorporated herein by reference. Another example is to manage and/or edit brands and or advertisements. This example is shown with reference numbers 1320 and 1478, and associated reference numbers 1481, 1484 and 1475 and associated text, which is incorporated herein by reference. The processing for providing new brands and/or advertisements and the processing for editing brands and/or ads can be conducted with similar procedures and devices. One example a procedure and device is illustrated in FIG. 15.

Operation of the WMACMSVCN 12.0 is now discussed with reference to the example discussed above. Recall the example provided above, repeated here for convenience:

There are four brands on the system (each brand campaign may have more than one ad) and their maximum value per selections (this is provided by the advertiser, see FIG. 15) and selection rates (a selection rate is the number of times an ad from this brand campaign was selected divided by the number of times the brand was presented) as follows, and a device similar to a second price blind auction is used to determine the allocation:

Brand Campaign 1:
12% selection rate, $1.00 maximum value per selection=bid of $0.12;
Brand Campaign 2:
10% selection rate, $1.30 maximum value per selection=bid of $0.13;
Brand Campaign 3:
50% selection rate, $0.30 maximum value per selection=bid of $0.15;
Brand Campaign 4:
05% selection rate, $1.00 maximum value per selection=bid of $0.05;

The resulting allocation may be Brand Campaign 3 in position 1, having a cost of word of mouth impression of $0.13 (the bid of next available bidder), Brand Campaign 2 in position 2, having a cost of $0.12, Brand Campaign 1 in position three having a cost of $0.05, and Brand Campaign 4 dropped because it is in last place.

When an advertisement is first placed on the system, it has a selection ratio of 100%, but, with use, this changes to reflect the correct value. The WMACMSVCN 12.0 allows advertisers to preview the effect of different maximum values per selection in different classes before making the campaign a live campaign. After the campaign goes live, the advertiser will start incurring costs when an agent associates with the advertisement, according word of mouth impressions, described below. The WMASP 1.4 has a system for billing and electronic payment to reconcile these accounts.

For example, as illustrated in FIG. 15 and its text, an edit brand/ad flow procedure can be referenced or commenced, as indicated with reference numbers 1475 in FIGS. 14 and 1505 in FIG. 15. As illustrated in box 1510, WMASP 1.4 returns existing information for brands/ads whose edit or creation has been requested by AWMCMC 13.1, based on parameters if any specified by the advertiser 13.2 accessing the system, such as for example via step 1484. The parameters can include the brand the advertisement is associated with, its image, size, hyperlink, categories, subcategories, maximum value for word of mouth impression, etc. The parameters also can include a maximum daily budget allowance for a brand, and a way to access the maximum word of mouth impression preview component. As illustrated in box 1515, AWMCMC 13.1 renders information, provides methods for a user or advertiser to upload a local foiled for images and enters form input or also can access a word of mouth impression preview component. One example of this is display on the AWMCMC 13.1 of an html controlled screen (i.e. form), and optionally including a link to a word of mouth impression preview component. In one embodiment, the system then determines if the Advertiser has indicated updated information such as by submission of a form (1520). If there is updated information, AWMCMC 13.1 sends information to the WMASP 1.4 (1525), and the WMASP 1.4 uses the information to enter additional brand/advertisement data into an advertisement pool, such as on database 1.9, and in addition information used for billing purposes also can be updated (1530). Alternatively, the system also can determine if the advertiser has indicated a desire to operate the word of mouth preview component (1535). If yes, AWMCMC 13.1 sends information to WMASP 1.4, such as via a browser form submit (1540). The WMASP 1.4 looks up existing information for brands or ads whose edit or creation has been requested such as via the request for previews (1545). This can include the brand the advertisement is associated with, its image, size, hyperlink, categories, subcategories, maximum value for word of mouth impression, etc. The parameters also can include a maximum daily budget allowance for a brand. The desired information then can be passed on to the preview method module. As illustrated in box 1550, the preview method module, implemented via WMASP 1.4, calls for the internal ranking method module 11.1 to return a sorted list of advertisers according to the parameters passed to the preview method module and including the advertisement data that is being previewed (such as category, subcategory, color, requesting agent, etc.). The WMASP 1.4 uses the sorted ranking and looks up additional statistical information, if any, for the positions returned to give the advertiser a feel for expected activity at a position (1555). One example of the statistical information is that rank 3 pays $1.4 per word of mouth impression, gets selected 12% of the time, and has been selected by 120 agents, etc. (1555). The WMASP 1.4 returns information to AWMCMC 13.1 for rendering, creates content for modifying the previewed advertisement as well as turns it into a live advertisement if desired (1560). The AWMCMC 13.1 renders the information received and provides a facility or method for a user or advertiser to modify the advertisement and submits a new preview request if desired (1565). It also provides a facility to turn previewed information into a live advertisement if desired (1565). In one example, the AWMCMC 13.1 displays an html form for preview, modification and submission by an advertiser, and an optional submit button for going live (1565). Further previews can be performed as well (1570). If the advertiser indicates a desire for a new preview (such as via submitting modified information), the AWMCMC 13.1 sends information to WMASP 1.4, such as via a browser form submit (1575), and processing returns to module 1550. Alternatively, the advertiser can indicate a desire to make a preview session into a live campaign, such as by clicking on a live submit link or button (1580). In such a case, the AWMCMC 13.1 sends information to WMASP 1.4, such as via a browser form submit (1585). The WMASP 1.4 accesses a database and transforms the preview into a live advertisement (1590). Also it can enter the brand and/or advertisement data into an advertisement pool in a data storage (such as 1.9) and updates information such as used for billing in a billing module (1590). The edit brand and/or advertisement module flow ends and processing returns as desired (1595).

Figure 16:
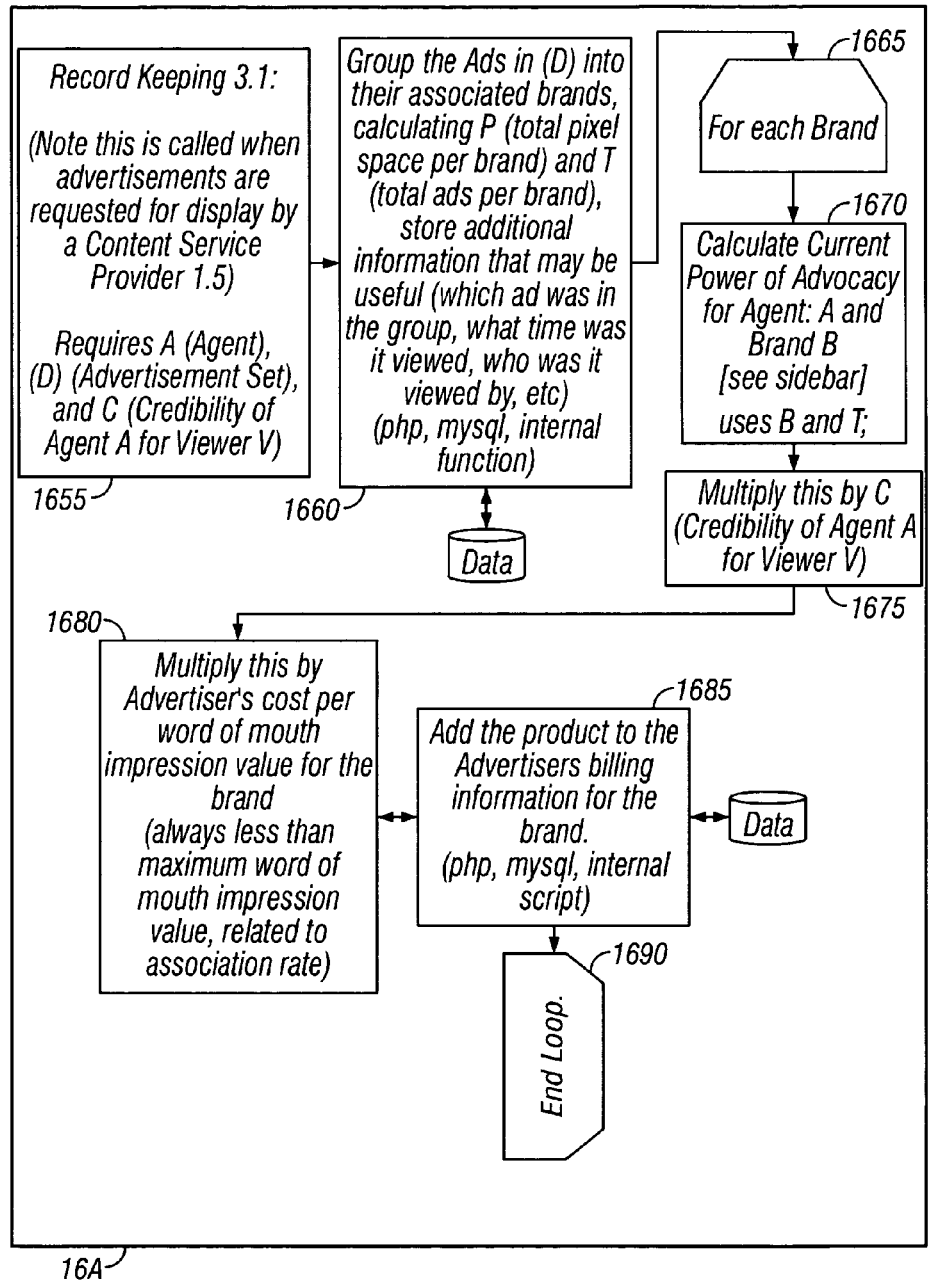
FIG. 16 is a flow chart showing the calculation and electronic billing of a word of mouth impression, in accordance with the present invention.
Figure 16:
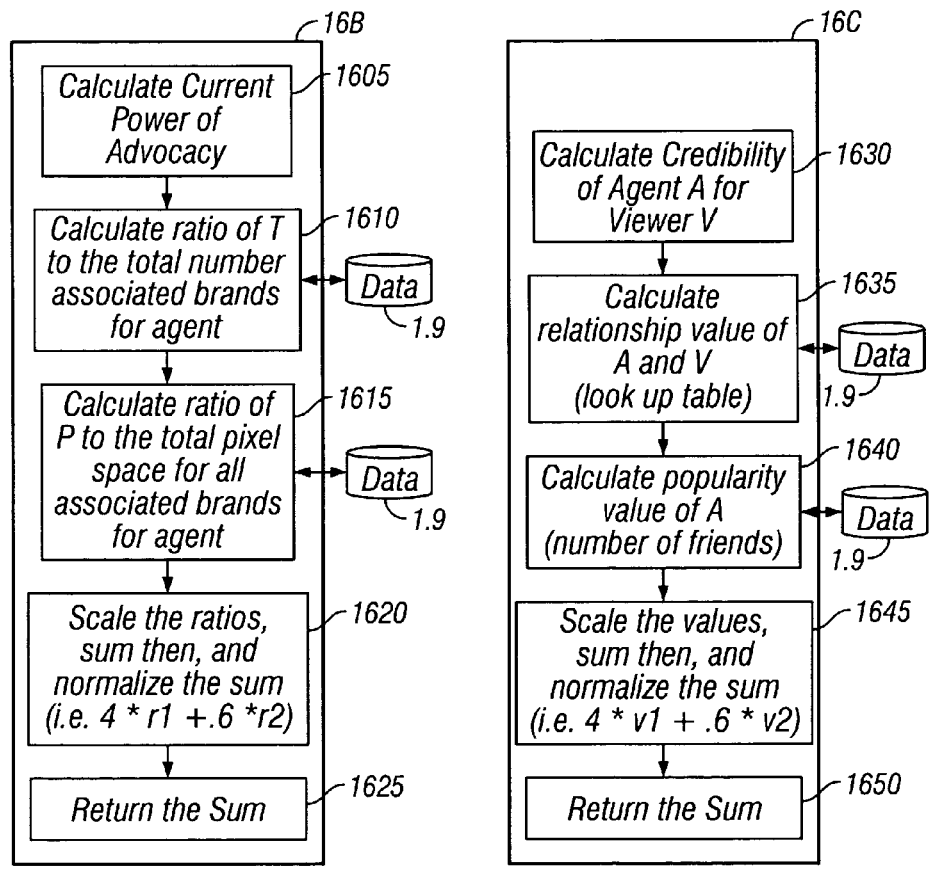

Referring to FIG. 16, there are shown methods and/or modules for evaluating the value of a word of mouth impression, which is useful for deriving revenue from a WMASVCN 1.0. FIG. 16 shows three components. The component on the left (16A) shows how incremental costs are incurred by advertisers 13.2 as a result of their brand word of mouth impression cost, the power of advocacy of the agent 2.2, and the relationship between the agent 2.2 and the viewer 2.1. The components on the right (16B and 16C) show how to calculate the power of advocacy of the agent 2.2 (16B) as well as the credibility of the agent 2.2 (16C). As illustrated in FIG. 16, in module 16B an exemplary processing module for determination of the power of advocacy for an agent 2.2 or other person/entity such as users or advertisers is provided. The power of advocacy value determination is started (1605) and then a ratio of the total ads per particular brand (T) to the total number of associated brands for the particular agent is determined (1610). A ratio of the total pixel space for the brand (P) to the total pixel space for all associated brands for the particular agent is determined (1615). The ratios are scaled, added and normalized, for example using the following equation (as illustrated in module 1620):

$$4*r1+0.6*r2.$$

The calculated sum optionally is returned to the processing module 16A as illustrated with return module 1625. Also as illustrated in FIG. 16, in module 16C an exemplary processing module for determination of credibility for an agent 2.2 or other person/entity, such as users or advertisers is provided. The determination of credibility is started (1630) and then a relationship value of an agent A and viewer V is calculated, such as for example using a look up table (1635) that can be in a database 1.9. A popularity value of the agent A is calculated, such as based on the number of friends associated with agent A (1640) and the date used can be in a database 1.9. The values are scaled, added and normalized, for example using the following equation (as illustrated in module 1645):

$$4*v1+0.6*v2.$$

The calculated sum optionally is returned to the processing module 16A as illustrated with return module (1650). Also as illustrated in FIG. 16, in module 16A an exemplary processing module for determination of incremental costs incurred by advertisers 13.2 as a result of their brand word of mouth impression cost, the power of advocacy of the agent 2.2, and the relationship between the agent 2.2 and the viewer 2.1. Module 16A preferably uses data concerning power of advocacy and credibility of an agent, such as determined by a processes and apparatus for which examples are provided in 16B and 16C, discussed above. Module 16A can also in one embodiment represent a component of record keeping module 3.1. The module is initiated (1655) and adds in a database are grouped into their associated brands. Values of total pixel space (P) per brand and total ads (T) per brand are determined (1660). Additional information that may be useful also is stored, such as the identifiers of ads in the group, what time each ad was viewed, who viewed it etc. (1660). Then a processing loop can be initiated for each of the brands involved in the present determination (1665). The current power of advocacy for an agent A and a brand B are determined such as by calling a subroutine, object and/or processing using a processing module, such as illustrated in 16B (1670). The value of the power of advocacy returned, such as via module 1625 is multiplied by a value of the credibility of agent A for a viewer V (1675). The value of the credibility of agent A for a viewer B is determined such as by calling a subroutine, object and/or processing using a module such as illustrated 16C (1675) and using the value of credibility returned such as via module 1650. The value determined in module 1675 is multiplied by the advertiser's cost per word of mouth impression for the brand (1680). For billing and record keeping purposes, the product data is added to the particular advertiser's billing information for the brand (1685), and the loop processing either is ended (if the last brand is reached) or returns to 1665 for further processing (1690).

Every time that a viewer accesses an associated advertisement or a set of associated advertisements, the advertiser incurs an incremental cost that is equivalent to the word of mouth impression for all brands that are represented by the ads that are shown to the viewer. This incremental cost is related to the relationship of the viewer to the agent, the strength with which the agent represents the brand, and the cost of word of mouth impression (the method of calculation used to calculate this cost is the second price blind auction described earlier). An example calculation of this would be the following:

Alice is viewing Bob's content on a web page. Alice is a direct friend of Bob. Bob has three identically sized advertisements on his page, two of which are part of the Nike brand campaign that was classified into clothing, one of which is an advertisement related to the Microsoft Server Family Brand that was classified into software. Bob has no other associated advertisements. The advertiser responsible for the Nike brand will incur a word of mouth impression cost as will the advertiser responsible for the Microsoft Server Family Brand. Both are calculated as follows: the Nike brand campaign current cost per word of mouth impression is dynamically calculated, running the second price auction component previously described for the advertisements in the clothing class using the advertiser's maximum value per selection and the recorded selection rate. The current cost per word of mouth impression for the Microsoft Server Family is also determined. Since Alice is a direct friend of Bob, this relationship value is looked up on the server and multiplied by Bob's popularity percentile to determine a credibility value for Bob. Let's assume this value is 0.8. Since the Nike Brand campaign makes of two-thirds of Bob's associated brands it has a power of advocacy of two-thirds and the Microsoft Server Family Brand makes of one-third of Bob's associated brands, it has a power of advocacy of one-third. Thus, the cost incurred by the advertiser for the Nike brand is ⅔*0.8*(the current cost per word of mouth impression for Nike). The cost incurred by the advertiser for the Microsoft Server Family is ⅓*0.8*(the current cost per word of mouth impression for the Microsoft Server Family Campaign).

It should be understood that additional information may be recorded by the WMASP 1.4 throughout this process as well as alternative means for calculating these values may be possible.

Figure 17:
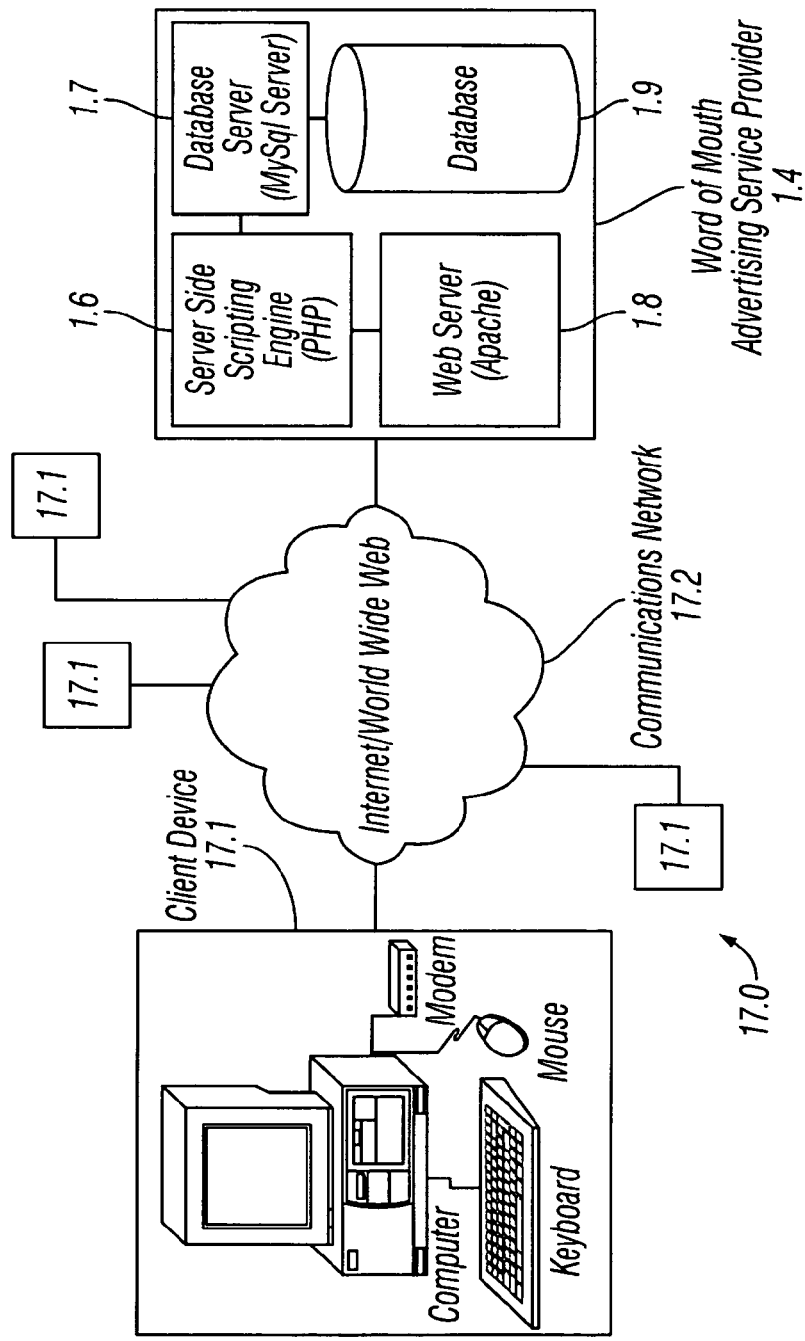
FIG. 17 is a block diagram for a word of mouth agent marketplace system (WMAMS), in accordance with the present invention.

Referring to FIG. 17, there is generally shown a Word of Mouth Advertising Marketplace System via a Communications Network (WMAMS) 17.0 in accordance with the present invention. The WMAMS 17 includes a plurality of client devices 17.1, each of which is coupled to a network 17.2, and, in turn, to a Word of Mouth Advertising Service Provider (WMASP) 1.4. Each client device 17.1, of which an example of one is shown in some detail and three others are represented in block form, is typically a personal computer, such as a Windows-based personal computer. It should be understood that client devices may also be laptops, PDA's, workstations, mobile phones, internet enabled TV, etc. Each client device 17.1 preferably has an input device such as a keyboard and/or mouse and a display for communication with a user. The client device has communications software and a modem (or some other form of Internet connectivity, such as a DSL modem, cable modem, T-1 line, ISDN line, etc). Communications software may be any software suitable for telecommunications, and is preferably browser software. The communications software is for communication over network 17.2 with a WMASP 1.4. Network 17.2 may be, for example, the Internet. Note that this diagram differs from FIG. 1 in that it does not require a CSP 1.5 for delivering content. Also take notice that the Client Devices 17.1 and the Communications Network 17.2 are labeled differently than in FIG. 1, 5, and 12, this is used to indicate that they may be different from the items listed in FIG. 1, 5, and 12; however, the preferred embodiment uses the same client devices (web browsers) in other embodiments, such as in the AASVCN 7.0, the WMASVCN 1.0, the WMACMSVCN 12.0, and the WMAMS 17.0, likewise, the network 17.2 may be the same network 1.2, 7.2, 12.2 as shown in other figures. In the preferred embodiment, the WMASP 1.4 is the same object in all of these, but it should be understood that the WMAMS 17.0 could utilize a separate WMASP 1.4.

Figure 18:
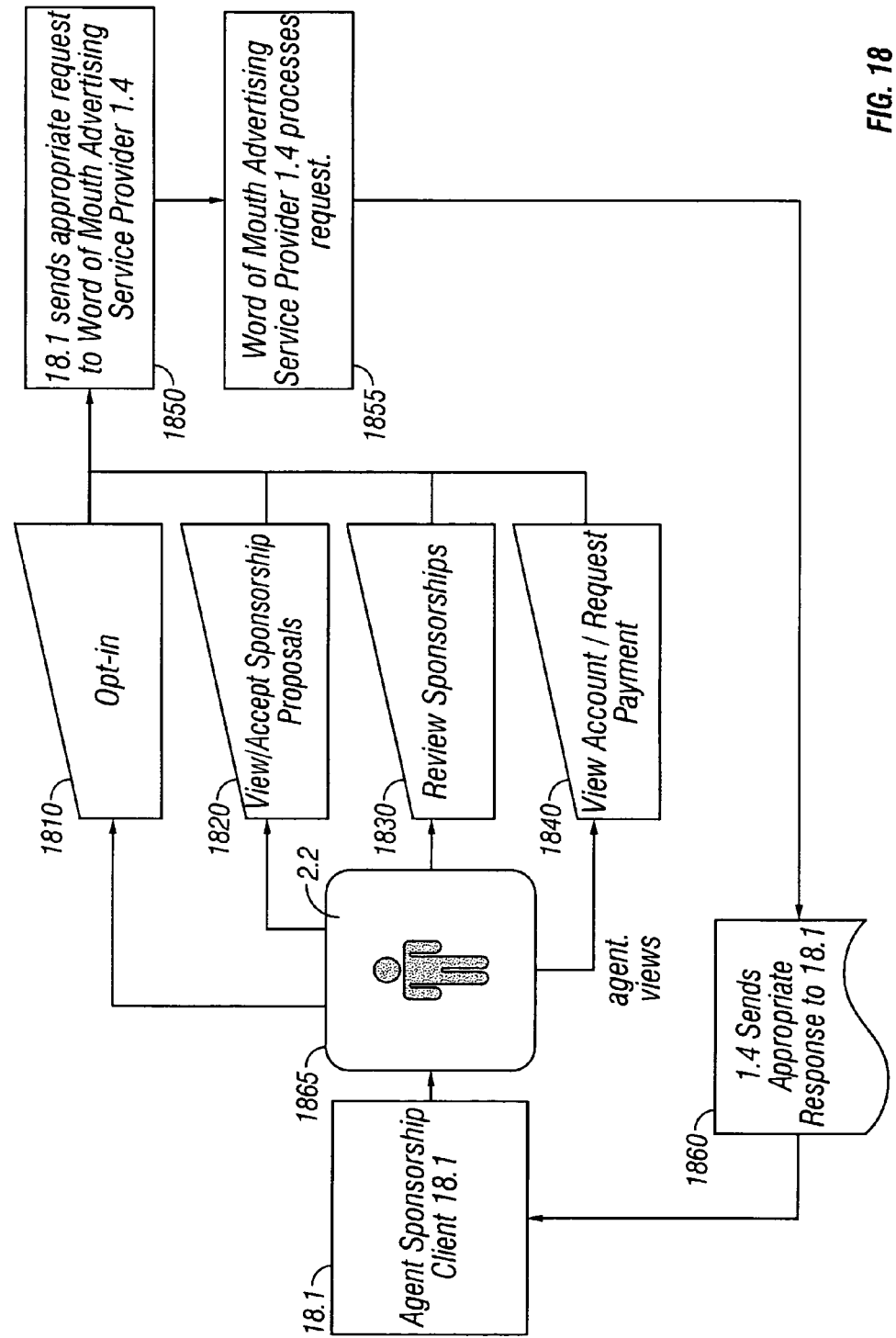
FIG. 18 is a flow chart depicting the high level functionality of a WMAMS where advertisers submit sponsorship proposals, in accordance with the present invention.
Figure 18:
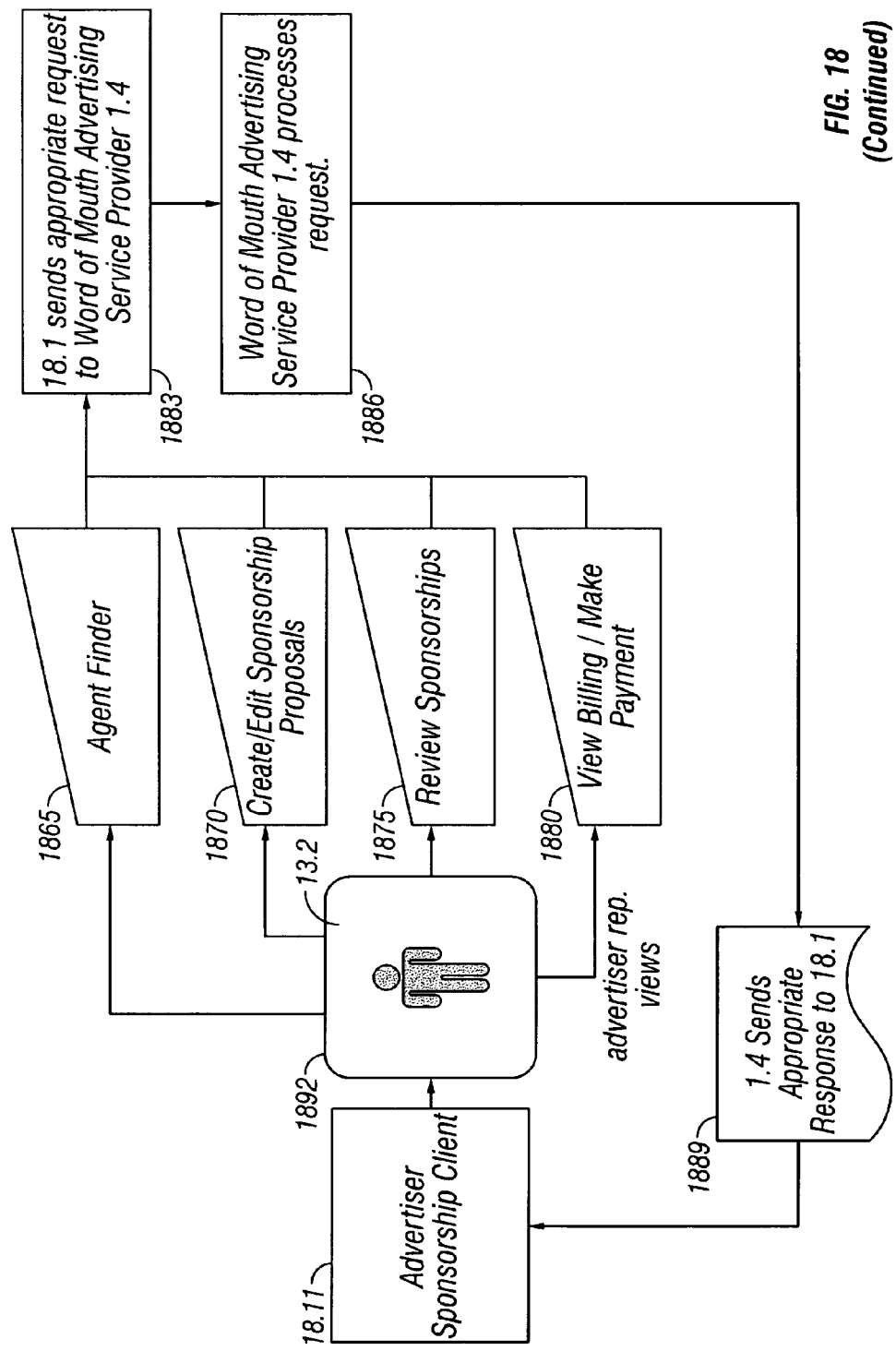
Figure 19:
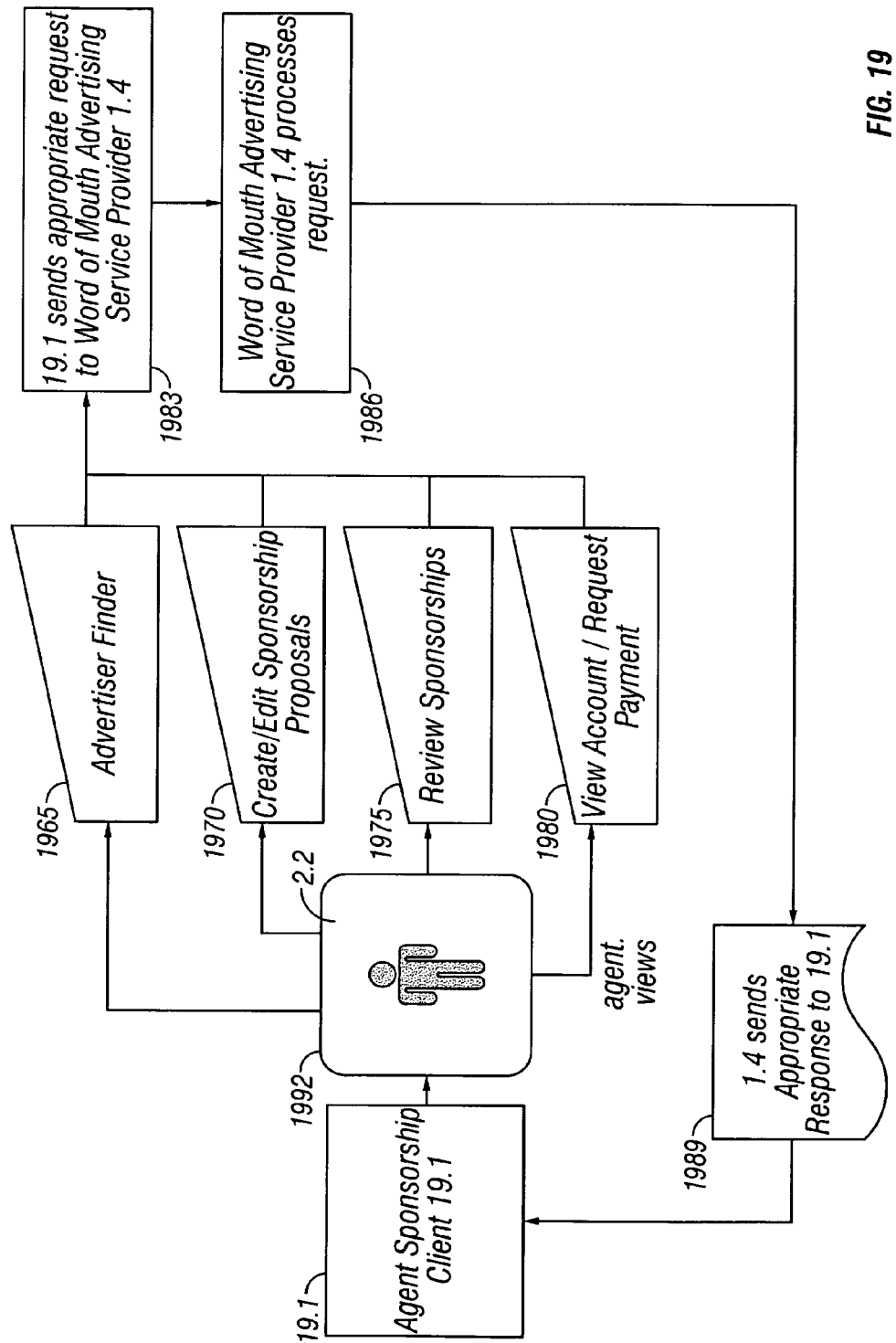
FIG. 19 is a flow chart depicting the high level functionality of a WMAMS where agents submit sponsorship proposals, in accordance with the present invention.
Figure 19:
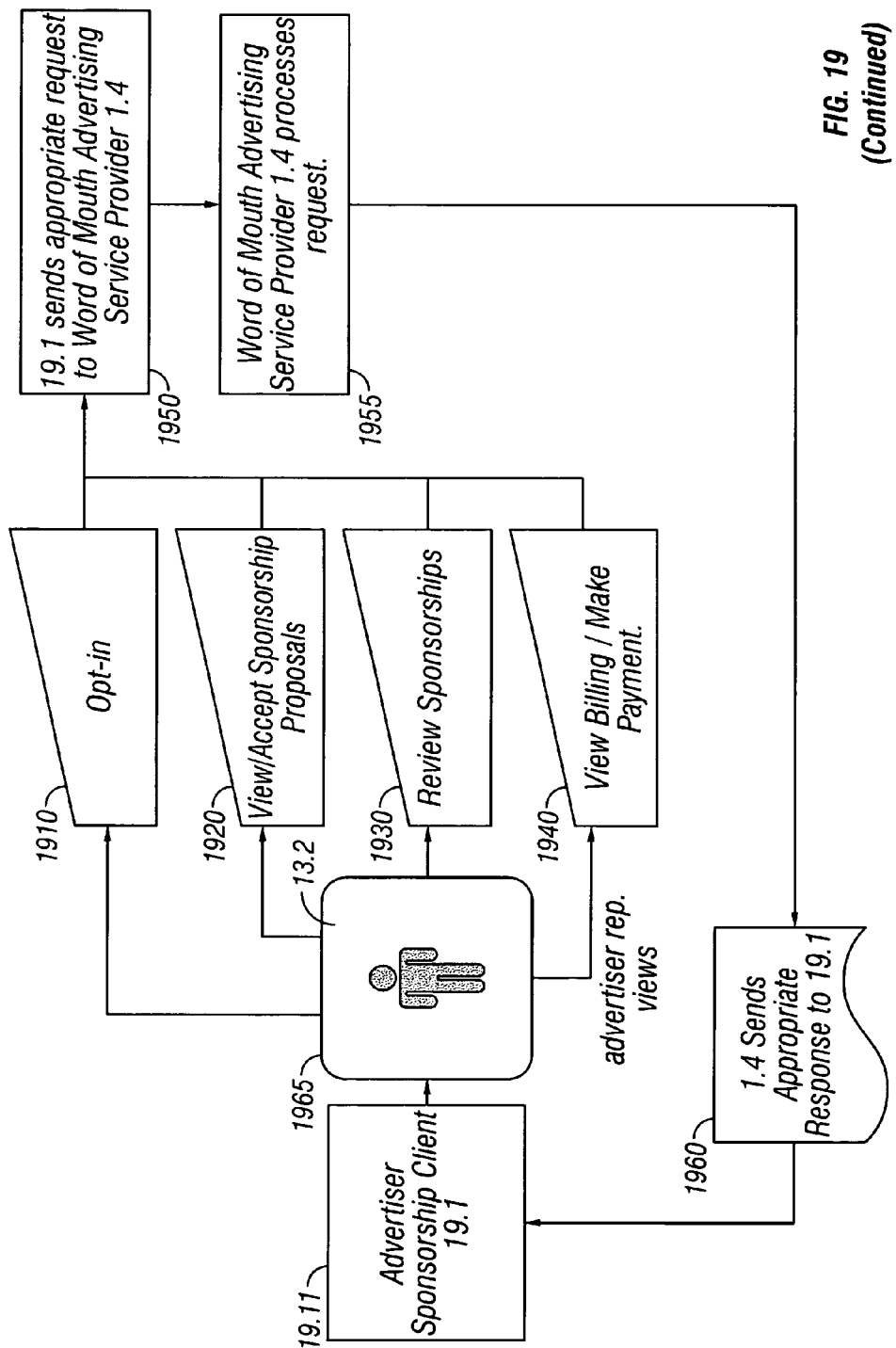

FIGS. 18 and 19 show two different functional flows for the WMAMS 17.0. The shared goal for the WMAMS 17.0 is to provide a marketplace where advertisers and agents can meet to achieve sponsorship objectives. FIG. 18 shows a system where an agent's prerogative to opt into the system and a client's responsibility to create proposals for the sponsorship of an agent that an agent may review and either accept or deny. FIG. 19 shows a system where the agent creates the proposals and submits them to advertisers who opt into the system and then request or deny these proposals. In both situations the proposal may include a reward for the agent. In a preferred scenario, the proposal includes a monetary premium that the agent receives for all the word of mouth impressions they are able to deliver, with the WMASP 4.1 taking a small percentage of each of these payments for providing the service and assuming the responsibility for the transfer of the funds. It should be understood that the reward may not be monetary and could be constructing in such a way for agents to redistribute the reward. This would be relevant if a CSP 1.5 was using the system to create a team of decentralized representatives where the content was related to the advertising, such as campus representatives, and the agent could achieve product price rewards that it could redistribute to its customers.

FIG. 18 provides flow charts illustrating an example of high level functionality of a WMAMS where advertisers submit sponsorship proposals. The WMAMS 17.0 generally provides the agent or advertiser with a number of capabilities and/or modules illustrated by way of example in FIG. 18 (top figure), such as the Opt-in module 1810, view and/or accept sponsorship proposals module 1820, review sponsorships module 1830, and view accounts and/or request payments module 1840. As described in FIG. 18, the Agent Sponsorship Client (ASC) 18.1 sends the appropriate request to the WMASP 1.4 (reference number 1850), the WMASP 1.4 processes the request (1855) and sends the appropriate response to the ASC 18.1 (reference number 1860). The agent 2.2 operates the ASC 8.1 as illustrated diagrammatically with box 1865 and the text "agent views".

In an advertiser embodiment, as shown in FIG. 18 (bottom figure), the WMAMS provides additional features, such as an agent finder module 1865, create/edit sponsorship proposals module 1870, review sponsorships module 1875 and view billing and/or make payment module(s) 1880. As described in FIG. 18, the Advertiser Sponsorship Client (AdvSC) 18.11 sends the appropriate request to the WMASP 1.4 (reference number 1883), the WMASP 1.4 processes the request 1886 and sends the appropriate response to the AdvSC 18.1 (reference number 1889). The advertiser or advertiser representative 13.2 operates the AdvSC 18.1 as illustrated diagrammatically with box 1892 and the text "agent views".

FIG. 19 provides flow charts illustrating an example of high level functionality of a WMAMS where agents submit sponsorship proposals. The WMAMS 17.0 generally provides the agent or advertiser with a number of capabilities and/or modules illustrated by way of example in FIG. 19 (top figure), such as an advertiser finder module 1965, create/edit sponsorship proposals module 1970, review sponsorships module 1975 and view billing and/or make payment module(s) 1980. As described in FIG. 19, the Agent Sponsorship Client (ASC) 19.1 sends the appropriate request to the WMASP 1.4 (reference number 1983), the WMASP 1.4 processes the request 1986 and sends the appropriate response to the ASC 19.1 (reference number 1989). The agent 2.2 operates the ASC 19.1 as illustrated diagrammatically with box 1992 and the text "agent views".

In an advertiser embodiment, as shown in FIG. 19 (bottom figure), the WMAMS provides additional features, such as an the Opt-in module 1910, view and/or accept sponsorship proposals module 1920, review sponsorships module 1930, and view billing and/or make payments module 1940. As described in FIG. 19, the Advertiser Sponsorship Client (AdvSC) 19.11 sends the appropriate request to the WMASP 1.4 (reference number 1950), the WMASP 1.4 processes the request 1955 and sends the appropriate response to the AdvSC 19.11 (reference number 1960). The advertiser or advertiser representative 13.2 operates the AdvSC 19.11 as illustrated diagrammatically with box 1965 and the text "agent views".

It should be understood that in one embodiment as already discussed herein, rewards can be re-distributed or re-directed by the individual or group receiving (or to receive) them. For example the rewards can be distributed in any fashion designated, either via pre-designation or after the reward is made. In one example, the individual or group designates a percentage distribution of the rewards, such as to incentivize referrals or other marketing activity. A monetary reward is made to the agent for all the word of mouth impressions they are able to deliver, with the WMASP 4.1 taking a small percentage of each of these payments for providing the service and assuming the responsibility for the transfer of the funds. The reward can be delivered fully to the agent and re-distributed or initially paid out in accordance with a payment system pre-designated. In other words, the reward may not be monetary and could be constructed in such a way for agents to redistribute the reward. This would be relevant if a CSP 1.5 was using the system to create a team of decentralized representatives where the content was related to the advertising, such as campus representatives, and the agent could achieve product price rewards that it could redistribute to its customers. Likewise it is relevant to other systems as well, such as to distribute awards in an affinity group.

Figure 20:
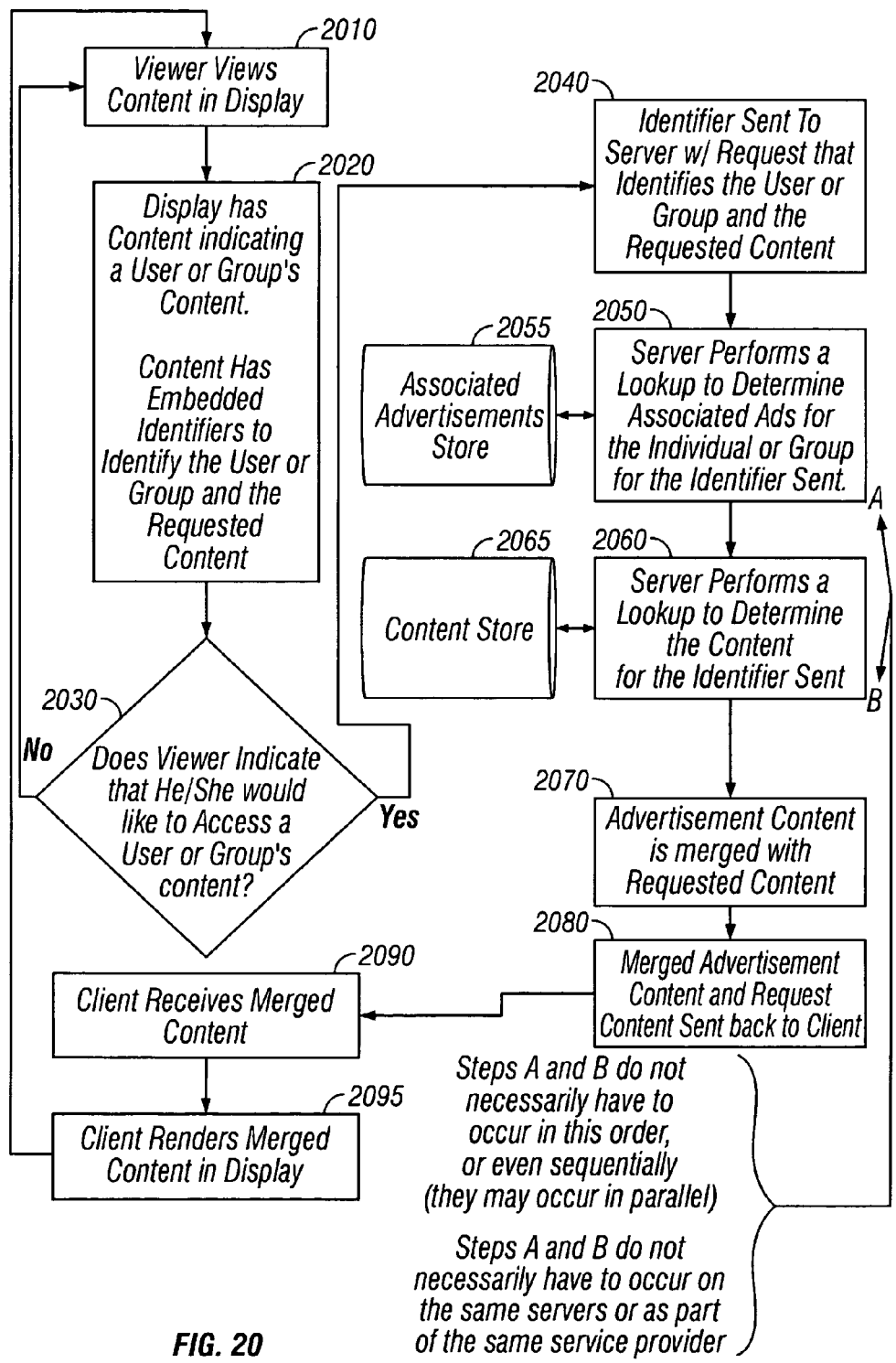
FIG. 20 is a flowchart depicting client-server interaction for individual and group associated advertisements, in accordance with the present invention.
Figure 21:
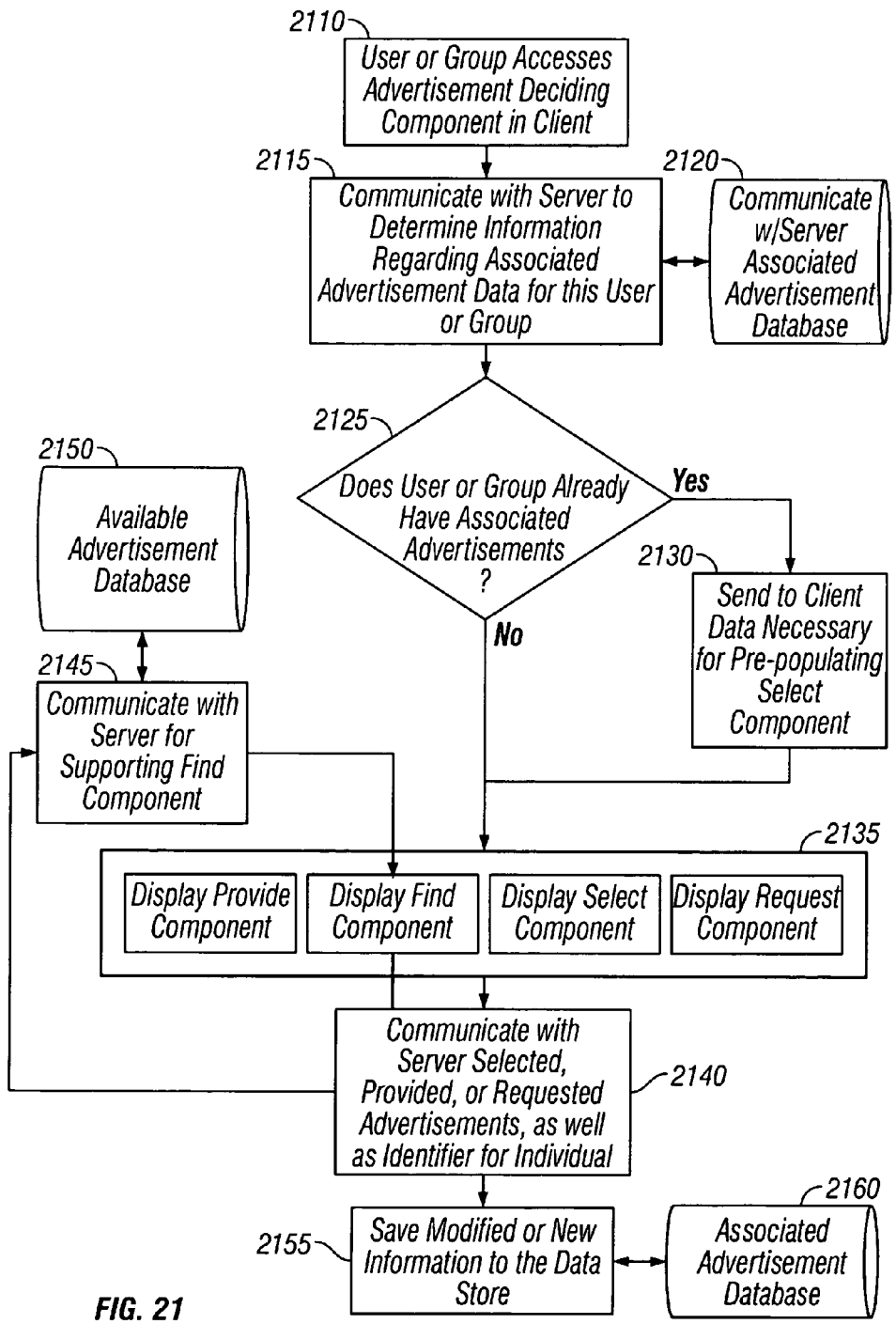
FIG. 21 is a flowchart depicting interactive advertisement association components for individuals or groups, in accordance with the present invention.
Figure 22:
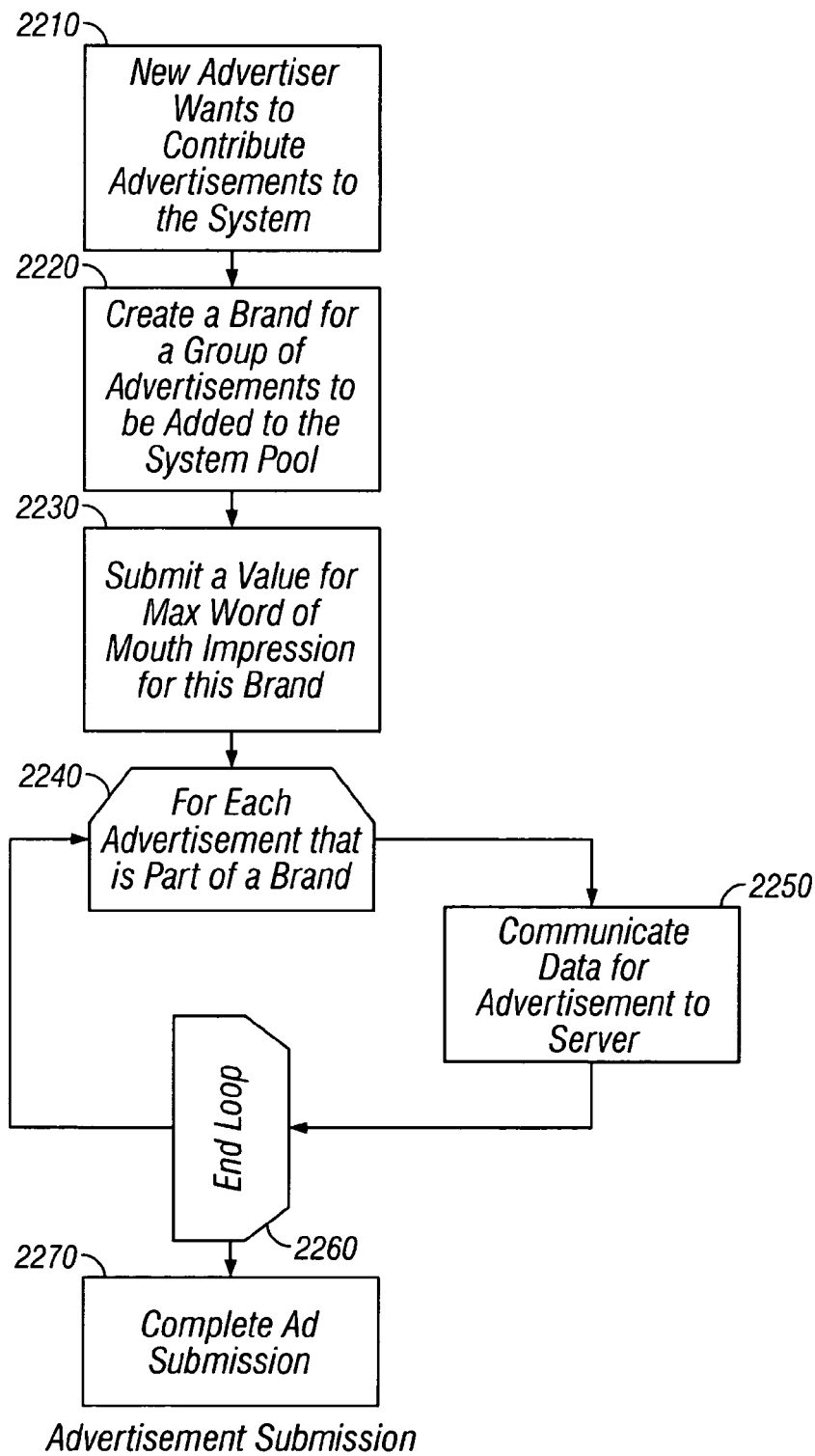
FIG. 22 is a flowchart depicting processing of advertiser costs for advertisement submission, in accordance with the present invention.
Figure 23:
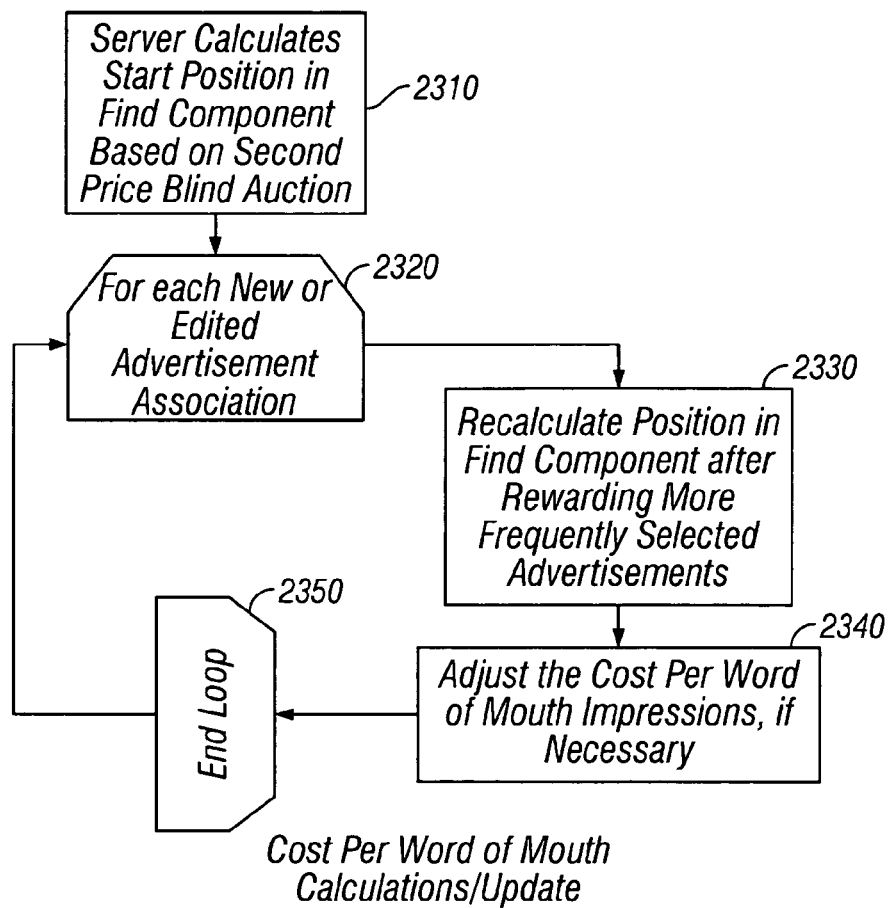
FIG. 23 is a flowchart depicting processing of advertiser costs for cost per word of mouth calculations and updates, in accordance with the present invention.
Figure 24:
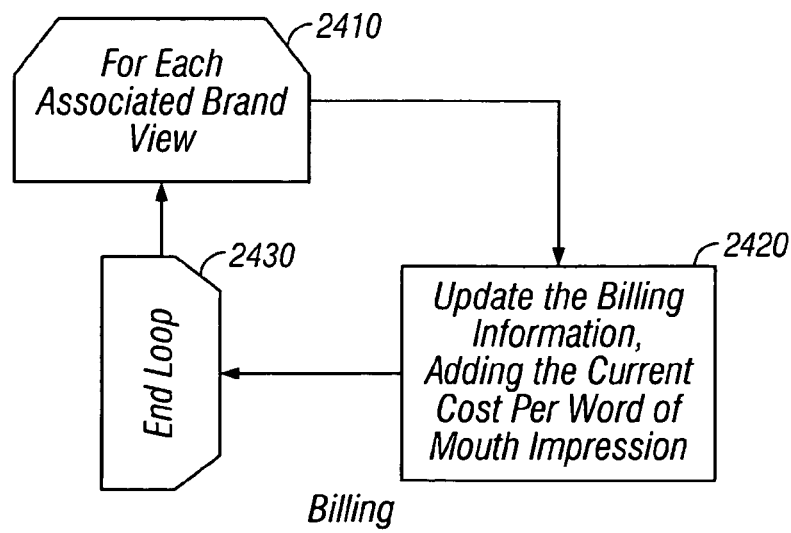
FIG. 24 is a flowchart depicting processing of advertiser costs for billing, in accordance with the present invention.

FIG. 20 is a flowchart depicting client-server interaction for individual and group associated advertisements. FIG. 21 is a flowchart depicting interactive advertisement association components for individuals or groups. FIG. 22 is a flowchart depicting processing of advertiser costs for advertisement submission. FIG. 23 is a flowchart depicting processing of advertiser costs for cost per word of mouth calculations and updates and FIG. 24 is a flowchart depicting processing of advertiser costs for billing.

Generally, the present invention is directed to a method of advertisement distribution (such as including implementing systems as well), with the method having the steps of: under control of a client system, displaying information identifying individuals or groups of individuals and/or their associated content; and in response to an action being performed indicating a desire for content relating to the individual or group of individuals, sending a request to display the requested information along with an identifier of the individual or group whose content is being requested to a server system; and under control of a server system: receiving the request; retrieving additional information regarding associated advertisements of the individual or group whose content is being requested, identified by the identifier in the received request; and returning to the client the content requested as well as associated advertisements using the retrieved information. The associated advertisements have been previously and expressly decided by the individual or group.

In one embodiment, the associated advertisements are previously and expressly decided via an interactive selection process by the individual or group. In another embodiment, the associated advertisements are previously and expressly decided via a request for the advertiser or advertisement. Alternatively, the associated advertisements are previously and expressly decided by the individual or agent via their supply by the individual or group. In another embodiment, the associated advertisements are previously and expressly decided by the individual or group via an explicit permission grant for their usage.

The method (as implemented by associated system components) also includes providing first and second display components, an action component, and a communication component, with the first display component displays information identifying individuals or groups or their associated content; the action component sends a request to a server for the content associated with the individual or group, the request including the identifier of the individual, group, and/or their associated content; the communication component transmits requests and receiving content from a server system; and the second display component displays the previously and expressly decided advertisements of the individual or group whose content is being accessed.

The first and second display components may exist in a browser window. The action component is selected from the group consisting of a hyperlink being activated, and a form being submitted. Additional information identifying the requestor is sent to the server. The advertisements are displayed so that the client user is aware that the advertisements are previously and expressly decided by the individual or group whose content is being accessed so they do not mistakenly believe that the advertisements are arbitrarily decided by another entity.

The method also includes providing a server system for returning the previously and expressly decided advertisements merged with associated content including a content delivery component for returning individual or group content; an advertisement delivery component including: a data storage medium storing information for a plurality of individuals or groups; a receiving component for receiving requests for content, a request including an indication of one of the plurality of individuals or groups whose content is desired; an advertisement retrieval component that retrieves from the data storage medium information for the indicated user or group whose content is being accessed and that uses the retrieved information to select advertisements from among the previously and expressly decided advertisements associated with the individual or group for merging with the requested content before both are sent to the client; and a merging component that combines the content and advertisements before they are sent back to the requesting client.

Additional information received from the requestor may be stored and/or used to select from the previous and expressly decided advertisements. The information about who is accessing the content and advertisements is stored in the data storage medium. Also, information about the relationships between individuals and groups may be utilized to provide a measure of the value for an individual or group's advertisements. The content delivery component and the advertisement delivery component may be operated independently, even on different servers.

The method also includes having individuals or groups decide the advertisements that they will be associated with prior to their association using: a server side component including a data storage medium storing advertising information for a plurality of advertisers, advertisements, users and groups; a client component for the deciding of associated advertisements with an individual or group including: a find component that allows individuals or groups to find participating advertisers and their advertisements by accessing the server's advertisement data storage medium; a provide component that allows individuals or groups to provide and communicate an advertisement to the server system for pending inclusion in the advertisement data storage medium; a request component that allows individuals or groups to express their desire for a product/service or product/service provider that does not currently participate in the advertising system and to communicate this to the server system; a selection component that allows individuals or groups to choose the advertisements that they will be associated with and to communicate this to the server system; and a remove/edit component, that allows individuals or groups to delete the association or modify the association and to communicate this to the server system.

The find component includes a search on the product or service name or the product or service provider's name by communicating with the server component. The find component includes the ability to browse product or service names or the product or service provider's names by communicating with the server component. The find component may also include recommended brands that are calculated using data mining techniques. The find component may restrict advertisements available to individuals or groups based on information about the individual or group, using a predetermined criteria, for example, corresponding to a certain advertiser that may only want males with income over $100,000.

The find component may include paid-for positioning brands that are targeted towards individual users or groups. Also, the find component displays additional detail about the advertisement by communicating with the server component, including:

a. the actual advertisement that will be displayed;
b. links for more information about the product/service or the provider of the product/service;
c. popularity of advertisement as defined by number of individuals or groups deciding to be associated with the advertisement;
d. popularity of advertisement as defined by the number of clicks that the advertisement receives; and
e. popularity of advertisement as defined by the number of views that the advertisement receives.

The find component features advertisers based on their comparative willingness to pay.

Using the method, the selection component allows individuals or groups to select advertisements that they view associated with other individual's or group's content. The interactive interface is a browser.

Advertisements are associated with categories in the storage database, including advertisement genre, and other categories that may be useful for supporting a searching component. Users or groups may elect to avoid association with the available advertisers including, in order to have word-of-mouth work, the option of non-association.

The method also includes the steps of: evaluating the value of advertisements associated with individuals or groups; and determining costs to advertisers, including the step of: grouping advertisements into brands as part of a campaign using: a first equation for approximating the number of word of mouth impressions for a brand, derived intuitively from the probability that a viewer will be impressed upon by the association of the brand and the individual or group, multiplied by the opportunities for impression or views, for all viewers viewing a particular brand across all associated individuals and groups:

number of viewer word of mouth impressions=probability of brand $B$ being impressed upon viewer $V$ by agent $A$*number of views by $V$ of $A$ with $B$ for all $V, A$, and chosen brand $B$; and a second equation for approximating the probability that a viewer will be impressed upon by the association of the brand and the individual or group, derived intuitively from the probability that a viewer will value the recommendation of an individual or group, multiplied by strength with which the individual or group advocates the brand:

probability of brand $B$ being impressed upon viewer $V$
by agent $A$=credibility of agent $A$ with viewer
$V$*power of advocacy of brand $B$ by agent $A$;

with the cost to an advertiser for a particular group of advertisements making up a brand is dependent on the number of word of mouth impressions.

A credibility component is used to determine the credibility values used in the second equation; wherein the credibility of agent A with viewer V is dependent on the relationship between the agent and the viewer, as defined by a relationship database storing predetermined credibility values C:
  friend: C=1.0;
  friend of friend: C=0.5;
  friend of friend of friend: C=0.25; and
  stranger: C=0.

Alternatively or in addition, the credibility component may also be used to determine the credibility values used in the second equation, with the credibility of agent A with viewer V is dependent on the number of relationships X that agent already has, as defined by a relationship database storing predetermined credibility values C:
  X>above 50 friends: C=1.0;
  50>X>25: C=0.5;
  X=0 friends: C=0;
with a higher credibility value is designated for more popular people. A weighted sum of both equations for determining the credibility values may be used.

The method may also use a power of advocacy component for determining the power of advocacy of brand B by agent A derived as a ratio of the number of times an advertisement of brand B appears associated with agent A and the total number of associated advertisements associated with agent A, for example, with an agent being associated with 18 ads, 3 of which are related to the brand being evaluated, having the ratio equal to 3/18.

Alternatively or in addition, the power of advocacy component is used for determining the power of advocacy of brand B by agent A derived as a ratio of the total amount of pixel space of all advertisements that appear of brand B with agent A and the total amount of pixel space used for all associated advertisements for agent A, for example, with an agent being associated with 18 ads totaling 30000 pixels, 3 of which are related to the brand being evaluated and having 1000 pixels each, determining the ratio equal to 3*1000/30000=0.1. A weighted sum of both equations for determining the power of advocacy values may be used.

The method also includes the steps of determining the positioning of available advertisements for display in the find component; and calculating the cost to the advertiser, including the steps of: using a first ranking component for determining the relative positioning of brands within a category or subcategory; and using a second ranking component used by advertisers for targeted marketing of brands to individuals or groups of individuals meeting some pre-specified criterion; with the cost to an advertiser is dynamically determined based on the ranking positioning of the advertiser's ads.

The method also includes determining the positioning of available advertisements for display in the find component; and calculating the cost to the advertiser, including the steps of: using a first ranking component for determining the relative positioning of brands within a category or subcategory; and using a second ranking component used by advertisers for targeted marketing of brands to individuals or groups of individuals meeting some pre-specified criterion; with the cost to an advertiser is dynamically determined based on the ranking positioning of the advertiser's ads; and with the rankings are determined using a second price blind auction model where a bid is a combination of an advertiser's stated maximum value for a word of mouth impression, and the advertisement's frequency of selection by associated individual or group.

The pre-specified criterion includes click-through (or click-through) rates, number of relationships as defined in a relationship database, profile information about the associated user or group, and statistics relating to the type of viewers that an individual or group may receive.

The method also includes using a server and client system including the steps of: under control of a client system: displaying information regarding advertiser campaigns and communicating with the server system; and under control of a server system: receiving requests from participating authorized and authenticated advertisers to perform the following actions: retrieving additional information regarding the advertisement activity to be sent to the client for viewing; managing an advertisement, including the ability to suspend or withdraw the advertisement from the system, and to change the maximum bid for a word of mouth impression for an advertisement, to change targeting information for the advertisement; providing a new advertisement to the system, including uploading any required files or information; and monitoring and paying any outstanding bills via an electronic payment system. The display component may be a browser.

The step of retrieving the additional information regarding the advertisement activity includes the steps of:
  a. breaking down the cost component for the advertisement requested;
  b. determining the total impressions for an advertisement;
  c. determining the total number of times an advertisement was clicked on;
  d. determining the total number of users or groups associated with an advertisement; and
  e. determining information regarding particular individual's or group's contribution to the campaign via their associated advertisements. Using the method, an advertiser can preview the effects of a higher bid using an auction system.

The method also includes the steps of procuring advertisers and advertisements for a system where advertisements are associated with individuals or groups; using the client-server system for receipt of requests from individuals or groups to be associated with non participating products/services companies; using a threshold for determining when the demand for an advertiser is high enough to approach the advertiser; using the client-server system to process a hypothetical advertisement based on the associations suggested by the number of requests for the non-participating product/service; and using means to convert the hypothetical campaign into a live campaign. The threshold is determined from the number of word of mouth impressions.

The means for conversion to a live campaign includes a system for processing a single request from the client for performing the conversion, such as a software procedure which responds to a single command, including clicking with a mouse on an icon in a GUI.

The present invention also includes a system for allowing advertisers indirect access to individuals or groups for obtaining sponsorship, with the system including a server-side component including a data storage medium storing for storing proposals and sponsorship information for a plurality of advertisers and users or groups; a first client component for individuals or groups to interact with the system including: an opt-in component for communicating to the server system that an individual or group wants to be part of the direct access system; a view-and-accept-or-reject-sponsorship-proposals component that allows individuals or groups to view sponsorship proposals created by advertisers and stored on the server system, and to accept and reject the proposals; a review-sponsorships component that allows individuals or groups to request from the server the sponsorships that they have rejected or accepted for review; a reward component that allows individuals or groups to receive benefits for their sponsorships and to communicate with the server to retrieve the benefit information; and a second client component for advertisers to interact with the system including: a find component that allows advertisers to find participating individuals or groups and their statistics by accessing the server's individual and group data storage medium; a create-and-edit proposals component that allows advertisers to draft and submit sponsorship proposals to the server system; a review-sponsorships component that allows advertisers to request from the server the sponsorships that they submitted to the system for review and tracking; and a provide-reward component that allows advertisers to provide benefits for their sponsored individuals or groups and to communicate with the server to provide the benefit information.

Alternatively, the system allows individuals or groups indirect access to advertisers for obtaining sponsorship, and includes a server-side component including a data storage medium storing for storing proposals and sponsorship information for a plurality of advertisers and users or groups; and a first client component for advertisers to interact with the system including: an opt-in component for communicating to the server system that an advertiser wants to be part of the direct access system; a view-and-accept-or-reject-sponsorship-proposals component that allows advertisers to view sponsorship proposals created by individuals and groups and stored on the server system, and to accept and reject the proposals; a review-sponsorships component that allows advertisers to request from the server the sponsorships that they have rejected or accepted for review; and a provide-reward component that allows advertisers to provide benefits for their sponsored individuals or groups and to communicate with the server to provide the benefit information; and a second client component for individuals or groups to interact with the system including: a find component that allows individuals or groups to find participating advertisers and their statistics by accessing the server's advertiser data storage medium; a create-and-edit-proposals component that allows individuals or groups to draft and submit sponsorship proposals to the server system; a review-sponsorships component that allows individuals or groups to request from the server the sponsorships that they submitted to the system for review and tracking; and a reward component that allows individuals or groups to receive benefits for their sponsorships and to communicate with the server to retrieve the benefit information.

The service provider receives a broker's fee for facilitating a successful sponsorship. The broker's fee is a one-time fee that is dependant on the size of the individual or group's audience and a fixed broker's fee. The proposals involve a premium per word-of-mouth-brand-impression that will be paid to the sponsoring individual or group. The service provider receives a percentage of the premium.

The advertisers reward the individuals or groups using an external service that can be monitored by the service provider using, for example, Paypal services and frequent flier miles. Alternatively, the rewards are monetary, and advertisers pay the service provider and the service provider delivers the reward to the individual or group. In another alternative embodiment, the rewards are product or service discounts afforded by the advertisers to the individuals or groups. The rewards can be redistributed by the individual or group receiving them, if the individual or group is participating in the system as well as selling content for the sponsor, they can pass discounts on to their clients. Many of the components described above may be operated independently and still be considered word of mouth advertising systems via communication networks. The preferred system combines all of the elements described above.

Although the present invention has been described in terms of various embodiments, it is not intended that the invention be limited to these embodiments. Modification within the spirit of the invention will be apparent to those skilled in the art.

For example, the usage of the method and system to create a network of brand representatives for a particular brand, and the subsequent use of these brand representatives to sell goods via a trusted network, their online presence and group, would be apparent to one skilled in the art.

The illustrated examples now will be discussed with reference to FIGS. 20-24. In the example illustrated in FIG. 20, a viewer has the option of viewing content in a display unit (2010). The display optionally has content indicating a user or group's associated content (2020). The content may have embedded identifiers that provide identification of the user or group and the requested content (2020). An determination module determines whether a viewer indicates that he/she would like to access a user or group's content, such as by an input operation like clicking on a link or button or otherwise utilizing a search module (2030). If no, processing can continue with step 2010 or any other option provided on the display. If yes, processing can continue with an identifier being sent to the server with a request that identifies the user or group and the requested content (2040). The server performs a lookup operation as a way to determine associated ads for the individual or group for the identifier sent (2050, step A) and optionally accesses a local or remote database 1.9, or as illustrated in FIG. 20, an associated advertisements store (2055). The server performs a lookup operation to determine associated content for the identifier (2060, step B), such as by accessing a local or remote database 1.9, or as illustrated in FIG. 20, content store 2065. It should be noted that as in all the examples provided herein, items 2050 and 2060 (steps A and B) are not necessarily required to be performed in the order illustrated or even sequentially (they can occur in parallel and/or with intervening operations). Likewise as in all the examples herein, they are not required to be performed on the same component or same server, or even as via the same service provider. Advertising content is merged with the requested content (or sent sequentially or in parallel) (2070). The advertisement content and request content is sent to the client system (2080), the client system receives the content (2090) and renders the content in a display (2095). Processing optionally returns to step 2010.

In the example illustrated in FIG. 21, a user or group has the option of accessing an advertisement deciding component in a client system (2110). Communication is had with a server system to determine information regarding one or more associated advertisement data for the user and/or group (2115). Optionally the server communicates with a local or remote database 1.9, such as an associated advertisement database (2120). A determination module determines whether the user and/or group already has associated advertisement (2125). If yes, the server optionally sends to the client system data necessary for pre-populating the select component (2130). In any event processing proceeds to the display of information at the client system, such as display of a provide component, find component, select component, request component etc. (2135). The client also can communicate with the server the selections of the various selection elements (2135), such as selected, provided or requested advertisements as well as identifier(s) (2140). Optionally if the find component is operated, the client system can communicate with the server for supporting the find component (2140, 2145) and the server can access a local or remote database 1.9 such as an available advertisement database (2150). Optionally the server saves modified or new information in a local or remote database 1.9 (2155), referred to as an associated advertisement database (2160).

In the example illustrated in FIG. 22 an exemplary flowchart depicting processing of advertiser costs for advertisement submissions is illustrated. In this example, a new advertiser desires to contribute advertisements to the system (2210). To do so, the advertiser can create a grouping called a brand for associated advertisements to be added to the system pool (2220). Optionally a value for the max word of mouth impression for this brand is submitted (2230). A processing loop module undertakes processing for each advertisement that is part of a brand (2240), data for the advertisement is communicated to the server (2250), until all the desired advertisements at that time are provided and the processing loop is ended (2260), at which time the ad submission is completed (2270) in this example.

In the example illustrated in FIG. 23 an exemplary flowchart depicting processing of advertiser costs for cost per word of mouth calculations and updates is provided. In this example, a server can calculate a state position in a find component based on second price blind auction (2310). A processing loop module undertakes processing for each new or edited advertisement association (2320) and recalculates positioning in the find component after rewarding more frequently selected advertisements (2330), and adjusting the cost per word of mouth impressions, if necessary (2340), until each new or edited advertisement association are provided and the processing loop is ended (2350).

In the example illustrated in FIG. 24 an exemplary flowchart depicting processing of advertiser costs for billing is provided. In this example, a processing loop module undertakes processing for each associated brand view (2410) and updates the billing information, adding the current cost per word of mouth impression (2420) until each associated brand view is processed and the processing loop is ended (2430).

Other embodiments of the present invention are inherent in the description provided herein and will not be discussed further. For example, a reputation module can associate a reputation rating with referrers such as agents (also called affinity agents). For example, users can assess the value of agents' referrals and affinity groups, such as by providing comments optionally accessible by other users. In this example, a rating system is provided in which a numerical or other indicator is provided for agents to indicate such factors as the user assessments, number of accesses, sales generated etc. As another example, an API can be provided for third party integration into the system whereby retailers and others can more easily integrate therein. As another example, other information or comments can be associated with an agent or user as desired. As a further example an advertiser can create or purchase a topic based interest group. Individuals or agents can join the group. Then users browsing users and agents can see their interest group affiliations and join as well.

Thus, it is seen that a system and method of word of mouth advertising, advertising association, and advertising campaign management via a communications network is provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A system comprising:
  a social network, wherein the social network comprises at least one server and a plurality of remote computers in data communication with the server, wherein an agent communicates with the social network and creates a profile containing at least a content submitted by the agent;
  a brand campaign management module configured to allow an advertiser to preview effects of different maximum values per selection of an advertisement before making the advertisement available;
  a selection module configured to provide an interface wherein an agent finds and selects plurality of advertisments to display from a pool of advertisements by searching for advertisements, providing advertisements, requesting unavailable advertisements, or removing or editing advertisements, the advertisements being sorted by selection rate and agents' willingness to pay for selection placement, and the agent endorses the advertisement by providing an indication of the endorsement;
  a delivery module configured to deliver a view to a viewer, the view comprising the selected advertisements and the content;
  a fee module that determines a fee associated with each of the selected advertisements by weighting the number of views with a credibility value of the agent and a power of advocacy of the agent associated with each of the advertisements, the power of advocacy for each of the advertisements being a ratio of an amount of pixel space used for the particularly advertisement and a total amount of pixel space used for all the selected advertisements; and
  a module that credits the agent with the fee.

* * * * *